(12) United States Patent
Takahashi et al.

(10) Patent No.: US 7,198,817 B2
(45) Date of Patent: *Apr. 3, 2007

(54) PROCESS FOR PRODUCING MAGNETIC RECORDING MEDIUM

(75) Inventors: Masatoshi Takahashi, Kanagawa (JP); Mikio Tomaru, Kanagawa (JP); Hiroshi Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 129 days.

This patent is subject to a terminal disclaimer.

(21) Appl. No.: 10/714,839

(22) Filed: Nov. 18, 2003

(65) Prior Publication Data

US 2004/0096575 A1    May 20, 2004

(30) Foreign Application Priority Data

Nov. 18, 2002  (JP) .............................. 2002-333012

(51) Int. Cl.
  *B05D 5/12* (2006.01)
(52) U.S. Cl. ................ 427/127; 427/131; 428/694 ST; 428/694 SL; 428/694 BS
(58) Field of Classification Search ................ 427/127, 427/126, 131; 428/694 ST, 694 SL, 694 BS
See application file for complete search history.

(56) References Cited

U.S. PATENT DOCUMENTS

| 5,506,064 | A | * | 4/1996 | Tamai et al. ............. 428/842.4 |
| 5,512,350 | A | * | 4/1996 | Ryoke et al. ................ 428/141 |
| 5,912,063 | A | * | 6/1999 | Osawa et al. ............ 428/847.1 |
| 6,017,605 | A | * | 1/2000 | Yamazaki et al. .......... 428/842 |
| 2003/0207484 | A1 | * | 11/2003 | Nishikawa .................... 438/31 |

FOREIGN PATENT DOCUMENTS

| JP | 60-079525 |    | 5/1985 |
| JP | 04-147423 |    | 5/1992 |
| JP | 04-147424 |    | 5/1992 |
| JP | 5-57647 | B2 | 8/1993 |
| JP | 6-12651 | A | 1/1994 |
| JP | 6-52541 | A | 2/1994 |
| JP | 6-309650 | A | 11/1994 |
| JP | 8-227517 | A | 9/1996 |
| JP | 2938548 | B2 | 6/1999 |
| JP | 2938549 | B2 | 6/1999 |

* cited by examiner

*Primary Examiner*—Alain L. Bashore
(74) *Attorney, Agent, or Firm*—Sughrue Mion, PLLC

(57) ABSTRACT

A process for producing a magnetic recording medium having at least one magnetic layer formed above a support is provided. The process includes a step of providing, on at least one side of the support, a smoothing coating layer having a thickness of 0.10 to 1 µm, a surface roughness of at most 5 nm, a number of projections having a height of 20 nm or higher measured by atomic force microscopy (AFM) of at most 20 projections/900 µm$^2$, and an amount of residual solvent of less than 10 mg/m$^2$, and a step of forming at least one magnetic layer on or above the smoothing coating layer without winding up.

17 Claims, No Drawings

PROCESS FOR PRODUCING MAGNETIC RECORDING MEDIUM

BACKGROUND OF THE INVENTION

1. Field of the Invention

The present invention relates to a process for producing a magnetic recording medium in which a smoothing coating layer is provided on a non-magnetic support, and a magnetic layer is formed directly on the smoothing layer or via a non-magnetic layer.

2. Description of the Related Art

In the field of magnetic disks, 2 MB MF-2HD flexible disks employing Co-modified iron oxide are standard equipment in personal computers. However, the volume of data to be handled is rapidly increasing at present, such a capacity is not sufficient, and there has been a desire for an increase in the capacity of flexible disks.

In the field of magnetic tapes also, accompanying the recent spread of mini computers, personal computers, and office computers such as work stations, magnetic tape for recording computer data as an external memory medium (so-called backup tape) has been intensively investigated. When a magnetic tape is put into practice for such an application, there has been a strong requirement for an increase in the recording capacity in order to achieve an increased recording capacity and a reduction in dimensions accompanying the reduction in the dimensions of computers and the increase in the information processing capacity.

Conventionally, as magnetic recording media, those formed by coating a non-magnetic support with a magnetic layer in which iron oxide, Co-modified iron oxide, $CrO_2$, a ferromagnetic metal powder (MP), or a hexagonal ferrite powder is dispersed in a binder are widely used. Among these, the ferromagnetic metal powder and the hexagonal ferrite powder are known to have excellent high density recording characteristics. In the case of disks, with regard to a high capacity disk employing a ferromagnetic metal powder having excellent high density recording characteristics, there are the 10 MB MF-2TD and the 21 MB MF-2SD, and with regard to a high capacity disk employing hexagonal ferrite, there are the 4 MB MF-2ED, the 21 MB floptical disk, etc., but they are not yet adequate from the viewpoints of capacity and performance. Under such circumstances, there have been a large number of attempts to improve the high density recording characteristics. For example, high density recording with a high capacity of 100 M to 120 M such as the LS-120 and ZIP has been achieved and, furthermore, high density recording having an areal density of 0.2 Gbit/inch$^2$ or higher is now being required. Moreover, because of requests to reduce the access time, there is a trend for the disk rotational speed to increase.

In magnetic recording media having such high density and high rotational speed or high transfer speed, in order to maintain stable record and playback thereof, their transport characteristics and durability are required to be higher than the conventional media. The prior art, which has been proposed mainly in order to improve the recording density and the transport durability in coated type magnetic recording media, is explained below.

For example, JP-A-6-52541 (JP-A denotes a Japanese unexamined patent application publication) discloses a magnetic tape in which the average projection height of an abrasive on the surface of a magnetic layer is 15 nm or less, the head wear and the head contamination are improved, and a balance is achieved between the electromagnetic conversion characteristics and the durability. JP-A-6-12651 discloses a magnetic disk in which the Ra of a magnetic layer is 15 nm or less, the distribution of projections of 30 nm or higher in the magnetic layer is from 125,000 to 250,000/mm$^2$, and the amount of a lubricant in the magnetic layer is given.

JP-A-6-309650 discloses a magnetic recording medium which contains 8 to 30 parts by weight of a lubricant relative to 100 parts by weight of a magnetic powder, and the number of projections having a height between that of the highest projection in a magnetic layer and 20 nm less than that is 400 to 2,500/mm$^2$, that is, a magnetic recording medium in which the transport stability is maintained by specifying the amount of lubricant in the magnetic layer and the population density of projections having a specific height on the surface of the magnetic layer and, in particular, a magnetic disk.

Conventionally, magnetic heads (induction type magnetic head) employing electromagnetic induction as the operating principle are widely used. However, when they are used in the high density record and playback field a limit starts to be seen. That is, in order to obtain a large playback output, it is necessary to increase the number of windings of a coil of a playback head, but this increases the inductance and increases the resistance at high frequency, and as a result the playback output decreases, which is a problem.

Recently, a playback head employing MR (magnetoresistance) as the operating principle has been proposed, its use in hard disks, etc. has started, and in JP-A-8-227517 its application to magnetic tape is proposed. The MR head gives a playback output several times that of the induction type magnetic head, and since it does not use an induction coil, equipment noise such as impedance noise is greatly reduced, and by reducing the noise of the magnetic recording medium it becomes possible to obtain a large S/N ratio. In other words, by reducing the magnetic recording medium noise, which had been hidden by equipment noise, record and playback can be carried out well, and the high density recording characteristics are outstandingly improved.

However, the MR head has the problem that it generates noise (thermal noise) under the influence of microscopic heating; in particular, it has the problem that when it hits a projection present on the surface of a magnetic layer, the noise suddenly increases and continues, and in the case of digital recording the problem can be so serious that error correction is impossible. This problem of thermal noise becomes serious in a magnetic recording medium used in a system in which a recorded signal having a recording density of 0.5 Gbit/inch$^2$ or higher is replayed.

In order to reduce such thermal noise, it is important to control the surface properties of the magnetic layer, and as a measure therefor the surface properties of a support have been controlled. For example, one in which a polyurethane coating layer is provided on a support (ref. Japanese Registered Patent Nos. 2938548 and 2938549) and one in which a layer formed from a compound that polymerizes by exposure to radiation is provided on a support (ref. JP-B-5-57647 (JP-B denotes a Japanese examined patent application publication)) have been proposed.

However, in the former prior art, the support thus produced is expensive, and the smoothness is inadequate.

Furthermore, in both the former and the latter prior art, it is assumed that the smoothed support is temporarily wound into a roll, and the roll thus wound is unwound in a separate step of applying a functional layer such as a magnetic layer by coating or vapor-deposition. However, the smoothed support is difficult to handle and easily creases, in particular while winding it, thus giving rise to the problem that the productivity and the yield greatly decrease.

BRIEF SUMMARY OF THE INVENTION

It is an object of the present invention to provide a process for producing a magnetic recording medium with high productivity and low cost, the magnetic recording medium having excellent electromagnetic conversion characteristics even in a record and playback system incorporating an MR head and, in particular, having an outstandingly improved C/N ratio or S/N ratio in the high density recording field.

The object of the present invention has been achieved by the following means.

A process for producing a magnetic recording medium having at least one magnetic layer formed on a support, the process comprising a step of providing, on at least one side of the support, a smoothing coating layer having a thickness of 0.10 to 1 µm, a surface roughness of at most 5 nm, a number of projections having a height of 20 nm or higher measured by atomic force microscopy (AFM) of at most 20 projections/900 µm$^2$, and an amount of residual solvent of less than 10 mg/m$^2$, and a step of forming at least one magnetic layer on the smoothing coating layer without winding up.

'Forming at least one magnetic layer on the smoothing coating layer' referred to here means forming the magnetic layer directly on the smoothing coating layer, and 'forming at least one magnetic layer above the smoothing coating layer' referred to here means forming the magnetic layer on the smoothing coating layer via a non-magnetic layer.

DETAILED DESCRIPTION OF THE INVENTION

The present invention is a process for producing a magnetic recording medium, wherein a smoothing coating layer having a thickness of 0.10 to 1 µm, a surface roughness of at most 5 nm, a number of projections having a height of 20 nm or higher measured by atomic force microscopy (AFM) (hereinafter, also called 'PN (20 nm or higher)') of at most 20 projections/900 µm$^2$, and an amount of residual solvent of less than 10 mg/m$^2$ is provided on at least one side of a support, and at least one magnetic layer is then formed on the smoothing coating layer without winding up.

The support on which the smoothing coating layer is to be provided is usually in the form of a roll; the smoothing coating layer is provided on the support while pulling it out, after the smoothing coating layer is dried without winding it up at least a magnetic layer is provided on the smoothing coating layer, and it is then cut into a predetermined shape and size. Therefore, even if the smoothing coating layer is highly smooth as described above, since problems such as creases can be prevented, a magnetic layer having excellent surface properties can be formed, thus improving the C/N ratio or the S/N ratio.

The smoothing coating layer can be provided on both sides of the support or on only one side thereof. For example, in the case of a disk-shaped magnetic recording medium, the smoothing coating layer is usually provided on both sides thereof, and in the case of a tape-form magnetic recording medium, it is usually provided on one side thereof, but there are no particular restrictions.

The thickness of the smoothing coating layer is 0.10 to 1 µm, and preferably 0.2 to 0.7 µm. When the thickness of the smoothing coating layer is in the above-mentioned range, it is easy to adjust the surface roughness and the PN (20 nm or higher) of the smoothing coating layer so as to be in the range of the present invention, and it is also advantageous for an increase in the capacity of the tape-form magnetic recording medium.

The surface roughness of the smoothing coating layer is denoted by the center plane average surface roughness Ra, which is obtained by measuring a 250 µm square by a TOPO-3D manufactured by Wyko Corporation. Ra is 5 nm or less, preferably 0.5 to 4.0 nm, and more preferably 1.0 to 3.0 nm.

The height of projections present in the smoothing coating layer is defined as the height obtained using as a reference plane a center plane determined by atomic force microscopy (plane for which the volume enclosed by a roughness curve and the plane is equal above and below the plane and is a minimum). Therefore, PN (20 nm or higher) means the density of projections, as the total number per 30 µm square, having a height relative to the reference surface of 20 nm or higher. PN (20 nm or higher) is 20 projections/900 µm$^2$ or less, and preferably 10 projections/900 µm$^2$ or less.

The smaller the PN (20 nm or higher) of the smoothing coating layer, the more preferable it is. When both Ra and PN (20 nm or higher) are in the above-mentioned ranges, the C/N ratio or the S/N ratio is improved.

The amount of residual solvent in the smoothing coating layer is less than 10 mg/m$^2$. It is preferably 5 mg/m$^2$ or less, and more preferably 2 mg/m$^2$ or less. If the amount of residual solvent is less than 10 mg/m$^2$, since the residual solvent does not travel to a coating layer on the smoothing coating layer, the strength of the coating layer can be maintained.

Means for forming the above-mentioned smoothing coating layer on a support is not particularly limited, but the following means are preferable.

1) Means for forming a smoothing coating layer by coating a support with a polymer solution and drying.

2) Means for forming a smoothing coating layer by coating a support with a coating solution containing a compound having a radiation curing functional group in the molecule and then curing by exposing to radiation.

Means 1) is explained first.

The polymer solution used here preferably has a viscosity of 50 mPa·s (50 cp) or less, and more preferably 30 mPa·s (30 cp) or less. The surface tension of the coating solution is preferably 22 mN/m or higher, and more preferably 24 mN/m or higher.

The polymer preferably has a number average molecular weight of 10,000 to 100,000. When a magnetic recording medium is formed by providing a coating layer on the smoothing coating layer, the polymer is preferably insoluble or difficult to dissolve in a solvent for the coating layer, and is particularly preferably a water-soluble polymer.

The polymer preferably has a glass transition temperature (Tg) of 0° C. to 120° C., and more preferably 10° C. to 80° C. In this range, blocking hardly occurs on end faces. Furthermore, since internal stress within the smoothing coating layer is relaxed, it is easy to ensure bonding power.

The polymer used here is not particularly limited, but those that satisfy the above-mentioned requirements are preferable, and examples thereof include polyamide, polyamideimide, polyester, polyurethane, and an acrylic resin.

Examples of the polyamide include a polycondensation compound of a diamine and a dicarboxylic acid, a ring-opening polymerization compound of a lactam, and a copolymer of a 1/1 (molar ratio) salt of a diamine and a dicarboxylic acid and a lactam such as caprolactam.

Examples of the diamine include hydrazine, methylenediamine, ethylenediamine, trimethylenediamine, tetramethylenediamine, pentamethylenediamine, hexamethylenediamine, heptamethylenediamine, octamethylenediamine, nonamethylenediamine, decamethylenediamine, diaminocyclohexane, di(aminomethyl)cyclohexane, bis-(4-aminocyclohexyl)methane, bis-(4-amino-3,5-methylcyclohexyl) methane, o-phenylenediamine, m-phenylenediamine, p-phenylenediamine, 4,4'-diaminobiphenyl, tolylenediamine, xylenediamine, naphthylenediamine, bis(aminomethyl)piperazine, bis(aminoethyl)piperazine, bis(aminopropyl)piperazine, 1-(2-aminomethyl)piperazine, 1-(2-aminoethyl)piperazine, and 1-(2-aminopropyl)piperazine.

Examples of the dicarboxylic acid include oxalic acid, malonic acid, succinic acid, glutaric acid, adipic acid, pimelic acid, azelaic acid, sebacic acid, cyclohexanedicarboxylic acid, orthophthalic acid, isophthalic acid, terephthalic acid, naphthalenedicarboxylic acid, and acid anhydrides thereof.

Examples of the lactams include $\alpha$-pyrrolidone, $\alpha$-piperidone, $\gamma$-butyrolactam, $\delta$-valerolactam, $\epsilon$-caprolactam, $\omega$-capryllactam, and $\omega$-laurolactam.

Examples of the polyamide include an amino acid polymer. The amino acid polymer may be a man-made material or a natural polymer, for example, a protein such as collagen.

The polyamide may also be appropriately selected from those described in Purrasutikku Zairyo Koza (Plastic Materials Series) (16) 'Poriamido Jushi (Polyamide Resins)' (Ed. by O. Fukumoto, The Nikkan Kogyo Shimbun, Ltd.); 'Gosei Kobunshi (Synthetic Polymers) V' (Asakura Publishing, Ed. by Murahashi, Imoto, and Tani); U.S. Pat. Nos. 2,130,497; 2,130,523; 2,149,273; 2,158,064; 2,223,403; 2,249,627; 2,534,347; 2,540,352; 2,715,620; 2,756,221; 2,939,862; 2,994,693; 3,012,994; 3,133,956; 3,188,228; 3,193,475; 3,193,483; 3,197,443; 3,226,362; 3,242,134; 3,247,167; 3,299,009; 3,328,352; and 3,354,123, and polyamides having a tertiary amino group described in JP-A-11-283241, etc.

The polyamideimide is obtained by a method in which a low molecular weight polyamide having a terminal amino group and an acid dianhydride or an ester thereof are reacted, a method in which a low molecular weight polyamide acid having a terminal amino group and a dibasic acid chloride are reacted, a method in which a trimellitic acid derivative and a diamine are reacted, etc.

Examples of the polyamide component include those formed from a diamine and a dicarboxylic acid or an amino acid, which are described above for the polyamide. Examples of the diamine used in the reaction with the trimellitic acid derivative include the above-mentioned diamines.

Examples of the acid dianhydride and esters thereof include 1,4-dimethyl pyromellitate, tetramethyl pyromellitate, ethyl pyromellitate, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, and 2,2',6,6'-biphenyltetracarboxylic dianhydride.

The low molecular weight polyamide acid having a terminal amino group can be formed by reacting the above-mentioned diamine with the above-mentioned acid dianhydride or ester thereof.

Examples of the dibasic acid chloride include chlorides of the above-mentioned dicarboxylic acids.

The polyamideimide used here can be selected appropriately from those described in 'Poriamido Jushi Handobukku (Polyamide Resin Handbook)' (The Nikkan Kogyo Shimbun, Ltd.), etc.

Examples of the polyester include those synthesized using a dicarboxylic acid and glycol.

Examples of the dicarboxylic acid include aromatic, aliphatic, and alicyclic compounds; specific examples thereof are the same as above, and aromatic compounds are preferable.

Examples of the glycol component include aliphatic, alicyclic, and aromatic glycols such as ethylene glycol, diethylene glycol, triethylene glycol, tetraethylene glycol, propylene glycol, butanediol, neopentyl glycol, hexanediol, cyclohexanediol, cyclohexanedimethanol, and bisphenol A.

Examples of the polyurethane include those produced by a known method using a polyol, a diisocyanate, a chain extending agent, etc.

Examples of the polyol include a polyester polyol, a polyether polyol, and a polycarbonate polyol. Examples of the polyester component of the polyester polyol include the above-mentioned polyesters. Examples of the diisocyanate include those cited in a section explaining a binder used in a magnetic layer. As the chain extending agent, a polyhydric alcohol, a polyamine (e.g., the above-mentioned diamines, etc.), etc. are used.

As the above-mentioned polymer used for formation of the smoothing coating layer, if necessary, one incorporating by copolymerization or an addition reaction at least one polar group selected from —COOM, —SO$_3$M, —OSO$_3$M, —P=O(OM)$_2$, —O—P=O(OM)$_2$, (in these groups, M denotes a hydrogen atom, an alkali metal, or ammonium), OH, NR$_2$, N$^+$R$_3$ (R denotes a hydrocarbon group), an epoxy group, SH, CN, etc. is preferably used. The amount of such a polar group is preferably selected appropriately from 0.1 to 3 meq/g.

Examples of a solvent for the smoothing coating layer coating solution include ketones such as acetone, methyl ethyl ketone, methyl isobutyl ketone, diisobutyl ketone, cyclohexanone, isophorone, and tetrahydrofuran, alcohols such as methanol, ethanol, propanol, butanol, isobutyl alcohol, isopropyl alcohol, and methylcyclohexanol, esters such as methyl acetate, butyl acetate, isobutyl acetate, isopropyl acetate, ethyl lactate, and glycol acetate, glycol ethers such as glycol dimethyl ether, glycol monoethyl ether, and dioxane, aromatic hydrocarbons such as benzene, toluene, xylene, cresol, and chlorobenzene, chlorohydrocarbons such as methylene chloride, ethylene chloride, carbon tetrachloride, chloroform, ethylene chlorohydrin, and dichlorobenzene, N,N-dimethylformamide, hexane, and water. These solvents do not always need to be 100% pure, and may contain an impurity such as an isomer, an unreacted compound, a by-product, a decomposed product, an oxide, or moisture in addition to the main component. The content of these impurities is preferably 30% or less, and more preferably 10% or less. Among these solvents, an alcohol such as methanol, ethanol, or isopropyl alcohol, water, cyclohexanone, methyl ethyl ketone, butyl acetate, etc. is preferably used singly or in combination.

Means 2), that is, means for forming a smoothing coating layer using a coating solution containing a compound having a radiation curing functional group in the molecule is now explained.

The compound having a radiation curing functional group in the molecule (hereinafter, also called a 'radiation curing type compound') used here means a compound having the property of polymerizing or crosslinking to form a polymer and being cured when given radiation energy such as an electron beam or ultraviolet rays. Reaction of the radiation curing type compound does not progress unless energy is given thereto. The coating solution containing the radiation curing type compound therefore has stable viscosity unless it is exposed to radiation, and high coating smoothness can be obtained. Furthermore, since the reaction proceeds instantaneously by virtue of the high energy of the radiation, a high coating strength can be obtained.

The molecular weight of the radiation curing type compound is preferably in the range of 200 to 2,000. When the molecular weight is in the above-mentioned range, since it is a comparatively low molecular weight, a coating easily flows in a calendering step, and a smooth coating having high formability can be realized.

Examples of a di- or higher-functional radiation curing type compound include an acrylate ester, an acrylamide, a methacrylate ester, a methacrylamide, an aryl compound, a vinyl ether, and a vinyl ester.

Specific examples of the difunctional radiation curing type compound include those obtained by adding acrylic acid or methacrylic acid to an aliphatic diol, and are represented by ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentylglycol dimethacrylate, and tripropylene glycol dimethacrylate.

It is also possible to use a polyether acrylate or a polyether methacrylate in which acrylic acid or methacrylic acid is added to a polyether polyol such as polyethylene glycol, polypropylene glycol, or polytetramethylene glycol, or a polyester acrylate or a polyester methacrylate in which acrylic acid or methacrylic acid is added to a polyester polyol obtained from a known dibasic acid and a known glycol.

It is also possible to use a polyurethane acrylate or a polyurethane methacrylate in which acrylic acid or methacrylic acid is added to a polyurethane obtained by reacting a known polyol or diol with a polyisocyanate.

It is also possible to use those having a cyclic structure such as those obtained by adding acrylic acid or methacrylic acid to bisphenol A, bisphenol F, hydrogenated bisphenol A, hydrogenated bisphenol F, or an alkylene oxide adduct thereof, or an isocyanuric acid alkylene oxide-modified diacrylate, an isocyanuric acid alkylene oxide-modified dimethacrylate, tricyclodecanedimethanol diacrylate, or tricyclodecanedimethanol dimethacrylate.

Specific examples of a trifunctional radiation curing type compound include trimethylolpropane triacrylate, trimethylolethane triacrylate, an alkylene oxide-modified triacrylate of trimethylolpropane, pentaerythritol triacrylate, dipentaerythritol triacrylate, an isocyanuric acid alkylene oxide-modified triacrylate, propionic acid dipentaerythritol triacrylate, a hydroxypivalaldehyde-modified dimethylolpropane triacrylate, trimethylolpropane trimethacrylate, an alkylene oxide-modified trimethacrylate of trimethylolpropane, pentaerythritoltrimethacrylate, dipentaerythritol trimethacrylate, an isocyanuric acid alkylene oxide-modified trimethacrylate, propionic acid dipentaerythritol trimethacrylate, and a hydroxypivalaldehyde-modified dimethylolpropane trimethacrylate.

Specific examples of a tetra- or higher-functional radiation curing type compound include pentaerythritol tetraacrylate, ditrimethylolpropane tetraacrylate, dipentaerythritol pentaacrylate, propionic acid dipentaerythritol tetraacrylate, dipentaerythritol hexaacrylate, and an alkylene oxide-modified hexaacrylate of phosphazene.

Among these, preferred specific examples are di- or higher-functional acrylate compounds having a molecular weight of 200 to 4,000, more preferred examples are difunctional acrylate compounds having a molecular weight of 200 to 2,000, and yet more preferred examples are those obtained by adding acrylic acid or methacrylic acid to bisphenol A, bisphenol F, hydrogenated bisphenol A, hydrogenated bisphenol F, or an alkylene oxide adduct thereof.

The radiation curing type compound used in the present invention may be used in combination with a polymeric binder. The binder used in combination is a polymer described in the above-mentioned Means 1), a known thermoplastic resin, thermosetting resin, a reactive resin, or a mixture thereof.

When ultraviolet rays are used as the radiation, it is preferable to use a polymerization initiator in combination. As the polymerization initiator, a radical photopolymerization initiator, a cationic photopolymerization initiator, or an amine photogenerating agent, etc. can be used.

Examples of the radical photopolymerization agent include x-diketones such as benzil and diacetyl, acyloins such as benzoin, acyloin ethers such as benzoin methyl ether, benzoin ethyl ether, and benzoin isopropyl ether, thioxanthones such as thioxanthone, 2,4-diethylthioxanthone, and thioxanthone-4-sulfonic acid, benzophenones such as benzophenone, 4,4'-bis(dimethylamino)benzophenone, and 4,4'-bis(diethylamino)benzophenone, Michler's ketones, acetophenones such as acetophenone, 2-(4-toluenesulfonyloxy)-2-phenylacetophenone, p-dimethylaminoacetophenone, α,α'-dimethoxyacetoxybenzophenone, 2,2'-dimethoxy-2-phenylacetophenone, p-methoxyacetophenone, 2-methyl[4-(methylthio)phenyl]-2-morpholino-1-propanone, and 2-benzyl-2-dimethylamino-1-(4-morpholinophenyl)-butan-1-one, quinones such as anthraquinone and 1,4-naphthoquinone, halogen compounds such as phenacyl chloride, trihalomethylphenylsulfones, and tris(trihalomethyl)-s-triazines, acylphosphine oxides, and peroxides such as di-t-butyl peroxide.

It is also possible to use as the radical photopolymerization agent a commercial product such as IRGACURE-184, IRGACURE-261, IRGACURE-369, IRGACURE-500, IRGACURE-651, or IRGACURE-907 (manufactured by Ciba-Geigy Ltd.), Darocur-1173, Darocur-1116, Darocur-2959, Darocur-1664, or Darocur-4043 (manufactured by Merck Japan), KAYACURE-DETX, KAYACURE-MBP, KAYACURE-DMBI, KAYACURE-EPA, or KAYACURE-OA (manufactured by Nippon Kayaku Co., Ltd.), VICURE-10, or VICURE-55 (manufactured by STAUFFER Co., Ltd.), TRIGONALP1 (manufactured by AKZO Co., Ltd.), SANDORAY 1000 (manufactured by SANDOZ Co., Ltd.), DEAP (manufactured by UPJOHN Co., Ltd.), or QUANTACURE-PDO, QUANTACURE-ITX, or QUANTACURE-EPD (manufactured by WARD BLENKINSOP Co., Ltd.).

Examples of the cationic photopolymerization initiator include diazonium salts, triphenylsulfonium salts, metallocene compounds, diaryliodonium salts, nitrobenzylsulfonates, α-sulfonyloxy ketones, diphenyldisulfones, and imidylsulfonates.

As the cationic photopolymerization initiator, commercial products such as Adeka Ultraset PP-33, OPTMER SP-150, OPTMER SP-170 (manufactured by Asahi Denka Co. Ltd.) (diazonium salt), OPTOMER SP-150, 170 (manufactured by Asahi Denka Co. Ltd.) (sulfonium salt), and IRGACURE 261 (manufactured by Ciba-Geigy Ltd.) (metallocene compound) can also be used.

Examples of the amine photogenerating agent include nitrobenzicarbamimates and iminosulfonates. These photopolymerization initiators are selected appropriately according to the exposure conditions (e.g., whether there is an oxygen atmosphere, an oxygen-free atmosphere), etc. These photopolymerization initiators may be used in a combination of two or more types.

A composition containing a radiation curing type compound or another binder and photopolymerization initiator is dissolved in a solvent that can dissolve them to give a coating solution, and the solvent is selected appropriately from those cited as examples in Means 1).

After the support is coated with the above-mentioned coating solution, and usually after it is dried, the coating layer is exposed to radiation. Drying is carried out by heating, which is preferred to natural drying. By appropriately selecting drying conditions such as heating temperature, drying time, and drying blowing rate, the amount of residual solvent in the smoothing coating layer can be made less than 10 mg/m$^2$.

When using an electron beam as the radiation, the total amount thereof is preferably 1 to 20 Mrad, and more preferably 3 to 10 Mrad.

When using ultraviolet rays as the radiation, the amount thereof is preferably 10 to 100 mJ/cm$^2$.

With regard to the ultraviolet rays (UV) and the electron beam (EB) irradiators and irradiation conditions, known techniques described in 'UV•EB Koka Gijutsu (UV•EB Curing Technology)' (Published by Sogo Gijutsu Center Co. Ltd.) and 'Teienerugi Denshisen Shosha no Oyogijutsu (Applied Technology of Low Energy Electron Beam Irradiation)' (2000, Published by CMC), etc. can be used.

The thickness of the smoothing coating layer depends on the components of the smoothing coating layer, etc., and the above-mentioned range is preferable. In the case of a magnetic tape, a thinner layer is preferable for higher capacity as long as the surface properties and the physical strength of the smoothing coating layer are maintained.

The coating solution for the smoothing coating layer can contain a filler in order to obtain desired surface properties. The maximum diameter of the filler is preferably 50 nm or less. When it is 50 nm or less, dropouts (DO) hardly occur.

However, a tape-form magnetic recording medium may be formed by modifying the above composition of the coating solution for the smoothing coating layer and coating the other side of the support with a coating solution forming a smoothing coating layer outside of the scope of the present invention, thus forming a backing layer, etc. In this case, a layer having another composition may be further formed on the smoothing coating layer.

The smoothing coating layer is required to be stable toward a coating solution for a magnetic layer or a coating solution for a non-magnetic layer. The amount of the smoothing coating layer that dissolves in a methyl ethyl ketone (MEK)/cyclohexanone mixed solution (1:1) is preferably 0.0 to 0.4 mg/cm$^2$, and more preferably 0.0 to 0.2 mg/cm$^2$.

The magnetic layer provided in the present invention is suitably of a coating type that contains as main components a ferromagnetic powder and a binder, and may also be of a ferromagnetic metal thin layer type. In the latter case, a magnetic layer can be provided by a known method such as vapor deposition or sputtering.

In the case of the coated type, the thickness of the magnetic layer is preferably 20 to 500 nm, and more preferably 50 to 200 nm.

The magnetic layer is preferably provided on a non-magnetic layer (also called a lower layer) containing a non-magnetic powder and a binder provided on the smoothing coating layer. The non-magnetic layer preferably has a thickness of 0.5 to 3.0 μm, and more preferably 0.8 to 2.0 μm.

The magnetic layer (also called an upper layer or an upper magnetic layer) and the non-magnetic layer are preferably provided by wet-on-wet (WAN) coating in which the magnetic layer is provided while the non-magnetic layer is still in a wet state.

A case in which a coated type magnetic recording medium is produced by the present invention is explained below by reference to each component.

(Magnetic Layer)

The magnetic recording medium of the present invention may be provided, on one side of a support or on both sides thereof, with a lower layer and a ultra thin magnetic layer. The upper and lower layers can be provided by providing an upper magnetic layer after the lower layer is applied and while the lower layer is in a wet state (W/W) or after the lower layer has dried, which is called wet-on-dry (W/D). From the viewpoint of productivity, simultaneous or sequential wet coating methods are preferable, but in the case of a disk, coating after drying can be used adequately. When the simultaneous or sequential wet coating (W/W) method is employed for a multilayer constitution, since an upper layer and a lower layer can be formed simultaneously, a surface treatment step such as a calender step can be utilized effectively, and even an ultra thin layer can improve the surface roughness of the upper magnetic layer. The coercive force Hc of the magnetic layer is preferably 160 kA/m or higher, the Bm of the ferromagnetic metal powder is preferably 0.2 to 0.5 T, and that of the hexagonal ferrite powder is preferably 0.1 to 0.3 T.

(Ferromagnetic Powder)

The ferromagnetic powder used in the magnetic layer is not particularly limited, and a ferromagnetic metal powder having α-Fe as a main component, and a hexagonal ferrite powder are preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferable for the powder to contain, in addition to α-Fe, at least one chosen from Al, Si, Ca, Y, Ba, La, Nd, Co, Ni and B, and more preferably at least one of Co, Y, and Al. The Co content is preferably 0 to 40 atom % relative to Fe, more preferably 15 to 35 atom %, and yet more preferably 20 to 35 atom %. The Y content is preferably 1.5 to 12 atom %, more preferably 3 to 10 atom %, and yet more preferably 4 to 9 atom %. The Al content is preferably 1.5 to 12 atom %, more preferably 3 to 10 atom %, and yet more preferably 4 to 9 atom %. These ferromagnetic powders may be treated in advance, prior to dispersion, with a dispersant, a lubricant, a surfactant, an antistatic agent, etc. Specifically, there are those described in JP-B44-14090, JP-B45-18372, JP-B47-22062, JP-B47-22513, JP-B46-28466, JP-B46-38755, JP-B474286, JP-B47-12422, JP-B47-17284, JP-B47-18509, JP-B47-18573, JP-B-39-10307, JP-B46-39639, U.S. Pat. Nos. 3,026,215, 3,031,341, 3,100,194, 3,242,005, and 3,389,014, etc.

The ferromagnetic powder may contain a small amount of a hydroxide or an oxide. The ferromagnetic metal powder can be obtained by a known production method and the following methods can be cited. There are a method involving reduction of a composite organic acid salt (mainly an oxalate) with a reducing gas such as hydrogen, a method in which iron oxide is reduced with a reducing gas such as hydrogen to give Fe or Fe—Co particles, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in an inert gas at low pressure, etc. The ferromagnetic metal powder thus obtained can be subjected to a known slow oxidation process, that is, it can be treated by any one of a method in which it is immersed in an organic solvent and then dried, a method in which after it is immersed in an organic solvent an oxygen-containing gas is fed in so as to form an oxidized film on the surface and it is then dried, and a method in which an oxidized film is formed on the surface by adjusting the partial pressures of oxygen gas and an inert gas without using an organic solvent.

The specific surface area ($S_{BET}$), obtained by the BET method, of the ferromagnetic metal powder used in the magnetic layer is preferably 45 to 80 $m^2/g$, and more preferably 50 to 70 $m^2/g$. When it is less than 45 $m^2/g$, the noise increases, and when it exceeds 80 $m^2/g$, it is difficult to obtain surface smoothness, which is undesirable. The crystallite size of the ferromagnetic metal powder of the magnetic layer is preferably 80 to 180 Å, more preferably 100 to 180 Å, and particularly preferably 110 to 175 Å. The length of the major axis of the ferromagnetic metal powder is preferably at least 0.01 μm and at most 0.15 μm, more preferably at least 0.03 μm and at most 0.15 μm, and particularly preferably at least 0.03 μm and at most 0.12 μm. The acicular ratio of the ferromagnetic metal powder is preferably 3 to 15, and more preferably 5 to 12. The saturation magnetization σs of the ferromagnetic metal powder is 100 to 180 A·$m^2$/kg, preferably 110 to 170 A·$m^2$/kg, and more preferably 125 to 160 A·$m^2$/kg. The coercive force of the ferromagnetic metal powder is preferably 160 to 280 kA/m, and more preferably 176 to 240 kA/m.

The water content of the ferromagnetic metal powder is preferably set at 0.01 to 2%. The water content of the ferromagnetic metal powder is preferably optimized according to the type of binder. The pH of the ferromagnetic metal powder is preferably optimized according to the binder used in combination therewith. The pH is usually in the range of 4 to 12, and preferably from 6 to 10. The ferromagnetic metal powder may be subjected to a surface treatment with Al, Si, P, or an oxide thereof, if necessary. The amount thereof is usually 0.1 to 10 wt % relative to the ferromagnetic metal powder. The surface treatment can preferably suppress adsorption of a lubricant such as a fatty acid to 100 mg/$m^2$ or below. The ferromagnetic metal powder may contain soluble inorganic ions such as Na, Ca, Fe, Ni or Sr ions in some cases. It is preferable for them to be substantially absent, but their presence at 200 ppm or below does not particularly affect the characteristics.

The ferromagnetic metal powder used in the present invention preferably has few pores, and the level thereof is 20 vol % or below, and more preferably 5 vol % or below. The form of the ferromagnetic metal powder may be any of acicular, rice-grain shaped and spindle-shaped as long as the above-mentioned requirements for the particle size are satisfied.

The SFD (switching field distribution) of the ferromagnetic metal powder itself is preferably low, and 0.8 or below is preferred. It is also preferable to narrow the Hc distribution of the ferromagnetic metal powder. When the SFD is 0.8 or below, the electromagnetic conversion characteristics become good, the output becomes high, the magnetization reversal becomes sharp with a small peak shift, and it is suitable for high-recording-density digital magnetic recording. The Hc distribution of the ferromagnetic metal powder can be narrowed by improving the goethite particle size distribution, preventing sintering, etc. in the ferromagnetic metal powder.

The hexagonal ferrite powder is now explained. Examples of the hexagonal ferrite powder used in the present invention include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. It may contain, in addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge or Nb. In general, those to which Co—Zn, Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The particle size is usually 10 to 100 nm as a hexagonal plate size, preferably 10 to 60 nm, and particularly preferably 10 to 50 nm. In particular, when a magnetoresistive head is used for playback in order to increase the track density, the plate size is preferably 40 nm or smaller so as to reduce noise, but if it is less than 10 nm, stable magnetization cannot be expected due to thermal fluctuation. When it exceeds 100 nm, the noise is high. In either case, it is not suitable for high density magnetic recording. The tabular ratio (plate size/plate thickness) is preferably 1 to 15, and more preferably 1 to 7. If the tabular ratio is low, the degree of packing in the magnetic layer becomes high, which is desirable, but adequate orientation cannot be obtained. If it exceeds 15, the noise increases due to inter-particle stacking. The specific surface area by the BET method of a powder having a particle size within this range is usually 10 to 100 $m^2/g$. The specific surface area substantially coincides with the value obtained by calculation using the plate size and the plate thickness. The distribution of the plate size and the plate thickness is preferably as narrow as possible. The distribution can be expressed using a numerical value by randomly measuring 500 particles on TEM photographs of the particles. The distribution is not a regular distribution in many cases, but a standard deviation regarding the average size is calculated as σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the magnetic substance can be adjusted so as to be on the order of 40 to 400 kA/m. A higher Hc is advantageous for high-density recording, but it is restricted by the capacity of the recording head. The Hc of the magnetic substance in the present invention is on the order of 160 to 230 kA/m, and preferably 176 to 280 kA/m. When the saturation magnetization of the head exceeds 1.4 T, it is preferably 176 kA/m or higher. The Hc can be controlled by the particle size (plate size, plate thickness), the types and the amount of element included, the element replacement sites, the conditions used for the particle formation reaction, etc.

The saturation magnetization σs is 40 to 80 A·m²/kg. A higher σs is preferable, but there is a tendency for the Hc to become lower when the particles become: finer. In order to improve the σs, making a composite of magnetoplumbite ferrite with spinel ferrite, selecting the types of element included and their amount, etc. is well known. It is also possible to use a W type hexagonal ferrite. Furthermore, when dispersing the magnetic substance, the surface of the magnetic particles can be treated with a material that is compatible with a dispersing medium and the polymer. With regard to a surface-treatment agent, an inorganic or organic compound can be used. Representative examples include oxides and hydroxides of Si, Al, P, etc., and various types of silane coupling agents and various kinds of titanate coupling agents. The amount thereof is 0.1% to 10% based on the magnetic substance.

The pH of the magnetic substance is also important for dispersion. It is usually on the order of 4 to 12, and although the optimum value depends on the dispersing medium and the polymer, it is selected from on the order of 6 to 11 from the viewpoints of chemical stability and storage properties of the medium. The moisture contained in the magnetic substance also influences the dispersion. Although the optimum value depends on the dispersing medium and the polymer, it is usually 0.01% to 2.0%.

With regard to the production method for hexagonal ferrite, there is glass crystallization method (1) in which barium oxide, iron oxide, a metal oxide that replaces iron, and boron oxide, etc. as a glass forming material are mixed so as to give a desired ferrite composition, then melted and rapidly cooled to give an amorphous substance, subsequently reheated, then washed and ground to give a barium ferrite crystal powder; hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; co-precipitation method (3) in which a barium ferrite composition metal salt solution is neutralized with an alkali, and after a by-product is removed, it is dried and treated at 1100° C. or less, and ground to give a barium ferrite crystal powder, etc., but any production method can be used in the present invention.

(Non-Magnetic Layer)

Next, the lower layer is explained in detail when a non-magnetic layer is provided as the lower layer between the smoothing coating layer and the magnetic layer.

The lower layer should not be restricted as long as it is substantially non-magnetic, but it usually comprises at least a resin, and is preferably one in which a powder, for example, an inorganic powder or an organic powder has been dispersed in a resin. The inorganic powder is usually preferably a non-magnetic powder, but a magnetic powder may be mixed therewith as long as the lower layer is substantially non-magnetic.

Examples of the non-magnetic powder include inorganic compounds such as a metal oxide, a metal carbonate, a metal sulfate, a metal nitride, a metal carbide and a metal sulfide. As the inorganic compound, α-alumina with an αa-component proportion of at least 90%, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. can be used singly or in combination. Particularly preferable in terms of a narrow particle size distribution, the possibility of having many means for imparting functionality, etc., are titanium dioxide, zinc oxide, iron oxide and barium sulfate, and more preferable are titanium dioxide and α-iron oxide.

The particle size of such a non-magnetic powder is preferably 0.005 to 2 pm, but it is also possible, as necessary, to combine non-magnetic powders having different particle sizes or widen the particle size distribution of a single non-magnetic powder, thus producing the same effect. The particle size of the non-magnetic powder is particularly preferably 0.01 to 0.2 μm. In particular, when the non-magnetic powder is a grain-shaped metal oxide, the average particle size is preferably 0.08 μm or below. When it is an acicular metal oxide, the average length of the major axis is preferably 0.3 μm or below, and more preferably 0.2 μm or below. The tap density is 0.05 to 2 g/ml, and preferably 0.2 to 1.5 g/ml.

The water content of the non-magnetic powder is 0.1 to 5 wt %, preferably 0.2 to 3 wt %, and more preferably 0.3 to 1.5 wt %. The pH of the non-magnetic powder is usually 2 to 11, and particularly preferably in the range of 5.5 to 10. The specific surface area of the non-magnetic powder is usually 1 to 100 m²/g, preferably 5 to 80 m²/g, and more preferably 10 to 70 m²/g. The crystallite size of the non-magnetic powder is preferably 0.004 to 1 μm, and more preferably 0.04 to 0.1 μm. The oil absorption measured using DBP (dibutyl phthalate) is 5 to 100 ml/100 g, preferably 10 to 80 ml/100 g, and more preferably 20 to 60 ml/100 g. The specific gravity is 1 to 12, and preferably 3 to 6. The form may be any one of acicular, spherical, polyhedral, and tabular. The Mohs hardness is preferably in the range of 4 to 10. The amount of SA (stearic acid) absorbed by the non-magnetic powder is 1 to 20 μmol/m², preferably 2 to 15 μmol/m², and more preferably 3 to 8 μmol/m². The pH is preferably in the range of 3 to 6. The surface of the non-magnetic powder is preferably subjected to a surface treatment so that $Al_2O_3$, $SiO_2$, $TiO_2$, $ZrO_2$, $SnO_2$, $Sb_2O_3$, ZnO or $Y_2O_3$ is present. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by coprecipitation, or a method in which alumina is firstly made present and the surface thereof is then treated with silica, or vice versa, can be employed. The surface-treated layer may be formed as a porous layer depending on the intended purpose, but it is generally preferable for it to be uniform and dense.

Specific examples of the non-magnetic powder used in the lower layer include Nanotite (manufactured by Showa Denko K.K.), HIT-100 and ZA-G1 (manufactured by Sumitomo Chemical Co., Ltd.), α-hematite DPN-250, DPN-250BX, DPN-245, DPN-270BX, DPN-500BX, DBN-SA1, and DBN-SA3 (manufactured by Toda Kogyo Corp.), titanium oxide TTO-51B, TTO-55A, TTO-55B, TTO-55C, TTO-55S, TTO-55D, SN-100, α-hematite E270, E271, E300, and E303 (manufactured by Ishihara Sangyo Kaisha Ltd.), titanium oxide STT-4D, STT-30D, STT-30, STT-65C, and α-hematite α-40 (manufactured by Titan Kogyo Kabushiki Kaisha), MT-100S, MT-100 T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), and 100A, 500A and calcined products thereof (manufactured by Ube Industries, Ltd.). Particularly preferred non-magnetic powders are titanium dioxide and α-iron oxide.

Incorporation of carbon black into the lower layer can give the known effects of a lowering of surface electrical resistance (Rs), a reduction in light transmittance, and giving a desired micro Vickers hardness. Furthermore, incorporation of carbon black into the lower layer can give an effect of storing a lubricant. Types of carbon black that can be used include furnace black for rubber, thermal black for rubber, black for coloring, and acetylene black. The carbon black used in the lower layer should have characteristics that have been optimized as follows according to a desired effect, and the effect can be increased by the use thereof in combination.

The specific surface area of the carbon black used in the lower layer is generally 100 to 500 $m^2/g$, and preferably 150 to 400 $m^2/g$, and the DBP oil absorption thereof is generally 20 to 400 ml/100 g, and preferably 30 to 400 ml/100 g. The particle size of the carbon black is generally 5 to 80 nm, preferably 10 to 50 nm, and more preferably 10 to 40 nm. The pH thereof is preferably 2 to 10, the water content thereof is preferably 0.1% to 10%, and the tap density is preferably 0.1 to 1 g/ml. Specific examples of the carbon black used in the present invention include BLACK-PEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600, MA-230, #4000 and #4010 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbia Carbon Co.), and Ketjen Black EC (manufactured by Akzo). The carbon black may be subjected to any of a surface treatment with a dispersant, etc., grafting with a resin, or a partial surface graphitization. The carbon black may also be dispersed in a binder prior to addition to a coating solution. The carbon black can be generally used in a range not exceeding 50 wt % based on the above-mentioned inorganic powder and not exceeding 40% of the total weight of the non-magnetic layer. The carbon black can be used alone or in a combination of different types thereof. The carbon black that can be used in the present invention can be chosen from, for example, those described in the 'Kabon Burakku Handobukku (Carbon Black Handbook)' (edited by the Carbon Black Association of Japan).

The lower layer can contain also an organic powder according to the intended purpose. Examples of the organic powder include a styrene-acrylic resin powder, a benzoguanamine resin powder, a melamine resin powder, and a phthalocyanine pigment. It is also possible to use a polyolefin resin powder, a polyester resin powder, a polyamide resin powder, a polyimide resin powder, or a polyethylene fluoride resin powder. They can be produced by methods such as those disclosed in JP-A-62-18564 and JP-A-60-255827.

With regard to a binder resin, a lubricant, a dispersant, an additive, a solvent, and a dispersion method used for the lower layer, those described below for the magnetic layer can be used. In particular, the types and quantities of the binder resin, the additive, and the dispersant can be determined according to known techniques relating to the magnetic layer.

(Binder)

A conventionally known thermoplastic resin, thermosetting resin, reactive resin or a mixture thereof is used as a binder in the present invention. The thermoplastic resin has a glass transition temperature of −100° C. to 150° C., a number-average molecular weight of 1,000 to 200,000, and preferably 10,000 to 100,000, and a degree of polymerization on the order of 50 to 1,000.

Examples thereof include polymers and copolymers containing as a repeating unit vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal and vinyl ether; polyurethane resins, and various types of rubber resins. Examples of the thermosetting resin and the reactive resin include phenol resins, epoxy resins, curing type polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. Details of these resins are described in the 'Purasuchikku Handobukku (Plastic Handbook)' published by Asakura Shoten. It is also possible to use a known radiation curing type resin in each of the layers. Examples of the resin and a production method therefor are disclosed in detail in JP-A-62-256219. The above-mentioned resins can be used alone or in combination. Combinations of a polyurethane resin with at least one selected from a vinyl chloride resin, a vinyl chloride-vinyl acetate copolymer, a vinyl chloride-vinyl acetate-vinyl alcohol copolymer, and a vinyl chloride-vinyl acetate-maleic anhydride copolymer, and combinations thereof with a polyisocyanate are preferred.

The structure of the polyurethane resin can be a known one such as polyester polyurethane, polyether polyurethane, polyether polyester polyurethane, polycarbonate polyurethane, polyester polycarbonate polyurethane, or polycaprolactone polyurethane. For the purpose of further improving the dispersibility and durability, the above-mentioned binders may preferably be incorporated, if necessary, by copolymerization or by an addition reaction, with at least one polar group selected from —COOM, —SO$_3$M, —OSO$_3$M, —P=O(OM)$_2$, —O—P=O(OM)$_2$ (wherein M represents a hydrogen atom, or an alkali metal salt), OH, NR$_2$, N$^+$R$_3$ (R represents a hydrocarbon group), an epoxy group, —SH, —CN, etc. The polar group content is $10^{-1}$ to $10^{-8}$ mol/g, and preferably from $10^{-2}$ to $10^{-6}$ mol/g.

Specific examples of the binder used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Corporation), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Denki Kagaku Kogyo Kabushiki Kaisha), MR-104, MR-105, MR-110, MR-100, MR-555 and 400X-110A (manufactured by Zeon Corporation), Nippollan N2301, N2302 and N2304 (manufactured by Nippon Polyurethane Industry Co., Ltd.), Pandex T-5105, T-R3080 and T-5201, Burnock D400, D-210-80, Crisvon 6109 and 7209 (manufactured by Dainippon Ink and Chemicals, Incorporated), Vylon UR8200, UR8300, UR8700, RV530 and RV280 (manufactured by Toyobo Co., Ltd.), Daiferamine 4020, 5020, 5100, 5300, 9020, 9022 and 7020 (manufactured by Dainichiseika Color & Chemicals Mfg. Co., Ltd.), MX5004

(manufactured by Mitsubishi Chemical Corp.), Sanprene SP-150 (manufactured by Sanyo Chemical Industries, Ltd.), and Saran F310 and F210 (manufactured by Asahi Kasei Corporation).

The amounts of binder used in the non-magnetic layer and the magnetic layer are in the range of 5 to 50 wt %, and preferably 10 to 30 wt %, based on the weight of the non-magnetic powder or the ferromagnetic powder. When a vinyl chloride resin is used, the amount thereof is 5 to 30 wt %, when a polyurethane resin is used, the amount thereof is 2 to 20 wt %, the amount of polyisocyanate is 2 to 20 wt %, and they are preferably used in combination, but if, for example, head corrosion is caused by a slight degree of dechlorination, it is possible to use a polyurethane alone or a combination of a polyurethane and an isocyanate alone. When a polyurethane is used in the present invention, the polyurethane has a glass transition temperature of −50° C. to 150° C., preferably 0° C. to 100° C., and more preferably 30° C. to 90° C., an elongation at break of 100% to 2,000%, a breaking stress of usually 0.05 to 10 kg/mm$^2$ (0.49 to 98 MPa), and a yield point of 0.05 to 10 kg/mm$^2$ (0.49 to 98 MPa).

The magnetic recording medium comprises two or more layers. Accordingly, the amount of binder, the contents of the vinyl chloride resin, polyurethane resin, polyisocyanate or other resin contained in the binder, the molecular weight of each of the resins forming the magnetic layer, the polar group content, and the above-mentioned physical properties of the resins, etc. can of course be varied in the non-magnetic layer and the magnetic layer as necessary, but it is better if these factors are optimized individually for the respective layers, and known techniques relating to multiple magnetic layers can be employed. For example, when the amount of binder is varied among the layers, increasing the amount of binder contained in the magnetic layer is effective in reducing scratches on the surface of the magnetic layer. For the purpose of improving head contact, the amount of binder in the non-magnetic layer can be increased, thereby imparting flexibility.

Examples of the polyisocyanate used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with a polyalcohol; and polyisocyanates formed by an isocyanate condensation reaction. These isocyanates are commercially available under the trade names of Coronate L, Coronate HL, Coronate 2030, Coronate 2031, Millionate MR and Millionate MTL (manufactured by Nippon Polyurethane Industry Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Urethane Co., Ltd.). These isocyanates may be used in each of the layers, either singly or in combinations of two or more thereof, taking advantage of a difference in curing reactivity.

(Carbon Black)

Examples of the carbon black for use in the magnetic layer include furnace black for rubber, thermal black for rubber, black for coloring, and acetylene black. The carbon black preferably has a specific surface area of 5 to 500 m$^2$/g, a DBP oil absorption of 10 to 400 ml/100 g, an average particle size of 5 to 300 nm, preferably 10 to 250 nm, and more preferably 20 to 200 nm, a pH of 2 to 10, a water content of 0.1 to 10 wt %, and a tap density of 0.1 to 1 g/ml. Specific examples of the carbon black used in the present invention include BLACKPEARLS 2000, 1300, 1000, 900, 905, 800, and 700, and VULCAN XC-72 (manufactured by Cabot Corporation), #80, #60, #55, #50, and #35 (manufactured by Asahi Carbon Co., Ltd.), #2400B, #2300, #900, #1000, #30, #40 and #10B (manufactured by Mitsubishi Chemical Corporation), CONDUCTEX SC, RAVEN 150, 50, 40, and 15, and RAVEN-MT-P (manufactured by Columbia Carbon Co.), and Ketjen Black EC (manufactured by Nippon EC). The carbon black may be subjected to any of a surface treatment with a dispersant, etc., grafting with a resin, or a partial surface graphitization. The carbon black may also be dispersed in a binder prior to addition to a magnetic coating solution. The carbon black may be used alone or in a combination of different types thereof. The carbon black is preferably used in an amount of 0.1% to 30% based on the amount of the magnetic material. The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for each of the magnetic upper layer and the non-magnetic lower layer according to the intended purpose on the basis of the above mentioned various properties such as the particle size, the oil absorption, the electroconductivity and the pH value, but it is better if they are optimized for the respective layers. Regarding carbon black for use in the magnetic layer, for example, those described in the Carbon Black Handbook above (edited by the Carbon Black Association of Japan) can be referred to.

(Abrasive)

With regard to abrasives used in the magnetic layer according to the present invention, known materials mainly having a Mohs hardness of 6 or above are used alone or in a combination thereof. Examples of the abrasive include α-alumina having an α-component proportion of 90% or above, β-alumina, silicon carbide, chromium oxide, cerium oxide, α-iron oxide, corundum, synthetic diamond, silicon nitride, silicon carbide, titanium carbide, titanium oxide, silicon dioxide, and boron nitride. A composite comprising these abrasives (formed by surface-treating an abrasive with another abrasive) may also be used. The abrasive may contain a compound or an element other than the main component in some cases, and the intended effect can be realized as long as the content of the main component is 90% or above. The abrasive preferably has a particle size of 0.01 to 2 μm, more preferably 0.05 to 1.0 μm, and particularly preferably 0.05 to 0.5 μm. In particular, for improving the electromagnetic conversion characteristics the abrasive preferably has a narrow particle size distribution. The durability can be improved by combining as necessary a plurality of abrasives having particle sizes that are different from each other, or employing a single abrasive having a wide particle size distribution, thus producing the same effect. The abrasive preferably has a tap density of 0.3 to 2 g/ml, a water content of 0.1% to 5%, a pH of 2 to 11, and a specific surface area of 1 to 30 m$^2$/g. The form of the abrasive used in the present invention may be any of acicular, spherical and cuboidal, but those having a shape that in part includes an edge have high abrasiveness, which is preferable. Specific examples of the abrasive include AKP-12, AKP-15, AKP-20, AKP-30, AKP-50, HIT-20, HIT-30, HIT-55, HIT-60A, HIT-70, HIT-80, and HIT-100 (manufactured by Sumitomo Chemical Co., Ltd.), ERC-DBM, HP-DBM, and HPS-DBM (manufactured by Reynolds Corp.), WA10000 (manufactured by Fujimi Incorporated), UB20 (manufactured by C. Uyemura & CO., Ltd.), G-5, Kromex U2, and Kromex U1 (manufactured by Nippon Chemical Industry Co., Ltd.), TF100 and TF140 (manufactured by Toda Kogyo Corp.), β-Random Ultrafine (manufactured by Ibiden Co., Ltd.), and B-3 (manufactured by Showa Mining Co., Ltd.). These abrasives may be added to the non-magnetic layer, if necessary. The addition of an abrasive to the non-magnetic layer allows both the surface profile and the protruding state of the abrasive to be controlled. The particle size and the amount of an abrasive that is added to the magnetic layer or the non-magnetic layer should be set at optimal values.

(Additive)

As an additive that is used in the magnetic layer and the non-magnetic layer, one having a lubricating effect, an antistatic effect, a dispersing effect, a plasticizing effect, etc. may be used. Examples thereof include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, an alkyl phosphate and an alkali metal salt thereof, an alkyl sulfate and an alkali metal salt thereof, polyphenyl ether, phenyl phosphonate, α-naphthylphosphoric acid, phenylphosphoric acid, diphenyl phosphate, ρ-ethylbenzenephosphonic acid, phenyl phosphite, amino-quinones, various types of silane coupling agents and titanium coupling agents, a fluorine-containing alkyl sulfate and an alkali metal salt thereof, a monobasic fatty acid having 10 to 24 carbons (which may contain an unsaturated bond and may be branched) and a metal salt thereof (with Li, Na, K, Cu, etc.), a mono-, di-, tri-, tetra-, penta- or hexahydric alcohol having 12 to 22 carbons (which may contain an unsaturated bond and may be branched), an alkoxy alcohol having 12 to 22 carbons, a mono-, di- or tri-fatty acid ester formed from a monobasic fatty acid having 10 to 24 carbons (which may contain an unsaturated bond and may be branched) and any one of mono-, di-, tri-, tetra-, penta- and hexa-hydric alcohols having 2 to 12 carbons (which may contain an unsaturated bond and may be branched), a fatty acid ester of a monoalkyl ether of an alkylene oxide polymer, a fatty acid amide having 8 to 22 carbons, and an aliphatic amine having 8 to 22 carbons.

Specific examples of the fatty acid include capric acid, caprylic acid, lauric acid, myristic acid, palmitic acid, stearic acid, behenic acid, oleic acid, elaidic acid, linolic acid, linolenic acid, and isostearic acid. Examples of the ester include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate; and examples of the alcohol include oleyl alcohol, stearyl alcohol and lauryl alcohol. Furthermore, examples of other additives that can be used include a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid, a phosphoric acid, a sulfate ester group, or a phosphate ester group; and an amphoteric surfactant such as an amino acid, an aminosulfonic acid, a sulfate ester or a phosphate ester of an amino alcohol, or an alkylbetaine. Details of these surfactants are described in the 'Kaimenkasseizai Binran (Surfactant Handbook)' (published by Sangyo Tosho Publishing). The lubricant, antistatic agent, etc. need not always be 100% pure and may contain, in addition to the main component, an impurity such as an isomer, an unreacted material, a byproduct, a decomposed product, or an oxide. However, the impurity content is preferably 30% or below, and more preferably 10% or below.

These lubricants and surfactants used in the present invention each have different physical functions. The types, amounts and proportions of a combination generating a synergistic effect thereof should be determined optimally according to the intended purpose. Examples of the synergistic effect include controlling bleeding out of the fatty acids to the surface by using fatty acids having different melting points from each other for the non-magnetic layer and the magnetic layer; controlling bleeding out of the esters to the surface by using esters having boiling points, melting points, and polarities that are different from each other; enhancing the coating stability by controlling the amount of surfactant; and enhancing the lubricating effect by increasing the amount of lubricant in the middle layer, but the examples are by no means limited thereto. In general, the total amount of the lubricants is 0.1% to 50%, and preferably from 2% to 25%, based on the weight of the magnetic substance metal powder or the non-magnetic powder.

All or a part of the additives used in the present invention may be added to a magnetic coating solution or a non-magnetic coating solution at any stage of its preparation. For example, an additive may be blended with a magnetic material before a kneading step; it may be added during the kneading step involving the magnetic material, a binder, and a solvent; it may be added during a dispersing step; it may be added after the dispersing step; or it may be added immediately before coating. Depending on the intended purpose, the purpose might be achieved by coating a part or all of the additives simultaneously with the magnetic layer or in succession after coating the magnetic layer. Depending on the intended purpose, the lubricant may be coated on the surface of a magnetic layer after calendering or after completion of slitting. The organic solvent that can be used in the present invention may be any known solvent and, for example, a solvent disclosed in JP-A-6-68453 can be used.

(Layer Arrangement)

The thickness in the arrangement of the magnetic recording medium is as follows: the support is 2 to 100 μm, and preferably 2 to 80 μm. The support used for a computer tape has a thickness in the range of 3.0 to 6.5 μm (preferably, 3.0 to 6.0 μm, and more preferably 4.0 to 5.5 μm).

An undercoat layer may be provided between the smoothing coating layer and the non-magnetic layer or the magnetic layer for the purpose of improving adhesion. The thickness of this undercoat layer is generally 0.01 to 0.5 μm, and preferably 0.02 to 0.5 μm. The present invention may be a double sided magnetic layer disk-shaped medium having the non-magnetic layer and the magnetic layer provided on both sides of the support, or they may be provided on only one side thereof. In this case, a backing layer may be provided on the other side to the non-magnetic layer and the magnetic layer in order to exhibit an effect in preventing the build-up of electrostatistic charge and correcting curl. The thickness of this backing layer is generally 0.1 to 4 µm, and preferably 0.3 to 2.0 µm. A known undercoat layer and backing layer can be used for this purpose.

The thickness of the magnetic layer of the medium can be optimally selected according to the saturation magnetization of the head used, the head gap length, and the recording signal bandwidth. The magnetic layer may comprise two or more layers each having different magnetic characteristics, and a known multiple magnetic layer structure can be applied to the present invention.

The lower layer exhibits its effects as long as it is substantially non-magnetic, and may deliberately contain a small amount of a magnetic substance as an impurity or intentionally. The substantially non-magnetic referred to here means that the residual magnetic flux density of the lower layer is 0.1 T or less, or the coercive force thereof is 8 kA/m or less, and there is preferably no residual magnetic flux density or coercive force.

(Backing Layer)

In general, magnetic tapes for recording computer data are required to have stronger repetitive transport characteristics than video tape or audio tape. In order to maintain high transport durability, the backing layer preferably contains carbon black and an inorganic powder.

It is preferable to use two types of carbon black having different average particle sizes in combination. In this case, it is preferable to combine fine particulate carbon black having an average particle size of 10 to 20 nm and coarse particulate carbon black having an average particle size of 230 to 300 nm. In general, by adding the above-mentioned fine particulate carbon black, the surface electrical resistance of the backing layer can be set low and the light transmittance can also be set low. Many magnetic recording devices utilize the light transmittance of a tape as a signal for operation, and in such cases the addition of fine particulate carbon black is particularly effective. Furthermore, the fine particulate carbon black generally has excellent retention of a liquid lubricant, and when a lubricant is used in combination, it contributes to a reduction in the coefficient of friction. On the other hand, coarse particulate carbon black having a particle size of 230 to 300 nm has a function as a solid lubricant, and also forms micro projections on the surface of the backing layer, thus decreasing the contact area and thereby contributing to a reduction in the coefficient of friction.

Specific commercial examples of the fine particulate carbon black are as follows. RAVEN 2000B (18 nm), RAVEN 1500B (17 nm) (all manufactured by Columbian Carbon Co.), BP 800 (17 nm) (manufactured by Cabot Corporation), PRINTEX 90 (14 nm), PRINTEX 95 (15 nm), PRINTEX 85 (16 nm), PRINTEX 75 (17 nm) (all manufactured by Degussa AG), and #3950 (16 nm) (manufactured by Mitsubishi Chemical Corporation).

Specific commercial examples of the coarse particulate carbon black include Thermal Black (270 nm) (manufactured by Karnculb Co.), and RAVEN MTP (275 nm) (manufactured by Columbian Carbon Co.).

When two types of carbon black having different average particle sizes are used in the backing layer, the proportions (ratio by weight) of the 10 to 20 nm fine particulate carbon black and the 230 to 300 nm coarse particulate carbon black are preferably in the range of 98:2 to 75:25 as the former: the latter, and more preferably in the range of 95:5 to 85:15.

The content of carbon black in the backing layer (when two types are used, the total content thereof) is usually in the range of 30 to 80 parts by weight relative to 100 parts by weight of the binder, and preferably in the range of 45 to 65 parts by weight.

It is preferable to use two different types of inorganic powder having different hardnesses. Specifically, a soft inorganic powder having a Mohs hardness of 3 to 4.5 and a hard inorganic powder having a Mohs hardness of 5 to 9 are preferably used. By adding a soft inorganic powder having a Mohs hardness of 3 to 4.5, the coefficient of friction can be stabilized during repetitive transport. Moreover, a hardness in this range will not wear a slide guide pole. This inorganic powder preferably has an average particle size in the range of 30 to 50 nm.

Examples of the soft inorganic powder having a Mohs hardness of 3 to 4.5 include calcium sulfate, calcium carbonate, calcium silicate, barium sulfate, magnesium carbonate, zinc carbonate, and zinc oxide. They can be used singly or in a combination of two or more types.

The content of the soft inorganic powder in the backing layer is preferably in the range of 10 to 140 parts by weight relative to 100 parts by weight of carbon black, and more preferably 35 to 100 parts by weight.

By adding a hard inorganic powder having a Mohs hardness of 5 to 9, the strength of the backing layer is increased and the transport durability thereof is improved. The use of this inorganic powder in combination with carbon black and the soft inorganic powder gives a strong backing layer having little degradation due to repetitive sliding. Furthermore, the addition of this inorganic powder can introduce a moderate level of abrasive powder, thereby reducing the adherence of shavings to tape guide poles, etc. In particular, when it is used in combination with the soft inorganic powder, the sliding properties against a guide pole having a rough surface improve, thus stabilizing the coefficient of friction of the backing layer.

The hard inorganic powder preferably has an average particle size in the range of 80 to 250 nm (more preferably 100 to 210 nm).

Examples of the hard inorganic powder having a Mohs hardness of 5 to 9 include α-iron oxide, α-alumina, and chromium oxide ($Cr_2O_3$). These powders may be used singly or in combination. Among them, α-iron oxide or α-alumina is preferable. The content of the hard inorganic powder is usually in the range of 3 to 30 parts by weight relative to 100 parts by weight of the carbon black, and preferably 3 to 20 parts by weight.

When the soft inorganic powder and the hard inorganic powder are used in combination in the backing layer, it is preferable to select the soft inorganic powder and the hard inorganic powder so that the difference in hardness between the soft inorganic powder and the hard inorganic powder is at least 2 (more preferably at least 2.5, and particularly preferably at least 3).

It is preferable for the backing layer to contain the two types of inorganic powder each having different Mohs hardnesses and having specific average particle sizes and the two types of carbon black having different average particle sizes.

The backing layer may contain a lubricant. The lubricant can be appropriately selected from the lubricants cited above as a lubricant that can be used in the non-magnetic layer or the magnetic layer. In the backing layer, the lubricant is usually added in the range of 1 to 5 parts by weight relative to 100 parts by weight of the binder.

(Support)

The support on which the smoothing coating layer is provided in the present invention is not particularly limited and is preferably substantially non-magnetic and flexible.

As a flexible support used in the present invention, known films can be used. Examples thereof include polyesters such as polyethylene terephthalate and polyethylene naphthalate; polyolefins; cellulose triacetate; polycarbonates; polyimides; polyamideimides; polysulfones; aromatic polyamides or aliphatic polyamides; and polybenzoxazole. A high-strength support such as polyethylene naphthalate or a polyamide is preferably used. If necessary, a laminate type support as disclosed in JP-A-3-224127 can be used so as to change the surface roughness of the magnetic layer surface and the base surface. The support may be subjected in advance to a corona discharge treatment, a plasma treatment, an adhesion promotion treatment, a heat treatment, a dust removal treatment, etc. It is also possible to use aluminum or a glass substrate as the support.

To attain the object of the present invention, it is preferable to use a support having a center plane average roughness Ra of 8.0 nm or below, as measured by a TOPO-3D manufactured by WYKO Corporation. In the present invention, since Ra can be set low by the smoothing coating layer, those having a comparatively large Ra can be used satisfactorily, and this is advantageous in terms of cost.

It is preferable that these supports are free from coarse projections of 0.5 μm or greater. The surface roughness profile can be controlled freely by the size and amount of a filler added as necessary to the support. Examples of the filler include acrylic-based organic powders, as well as oxides and carbonates of Ca, Si, and Ti. The support preferably has a maximum height Rmax of 1 μm or below, a ten-point average roughness Rz of 0.5 μm or below, a center plane peak height Rp of 0.5 μm or below, a center plane valley depth Rv of 0.5 μm or below, a center plane area factor Sr of 10% to 90%, and an average wavelength λa of 5 μm to 300 μm. To obtain desired electromagnetic conversion characteristics and durability, the surface projection distribution of the support can be controlled freely by the filler, and the number of projections having a size of 0.01 to 1 μm can be controlled so as to be in the range of 0 to 2,000 per 0.1 mm$^2$. In the present invention, the number of projections on the surface of the support is a value measured by an optical interference type measuring instrument.

The F-5 value of the support used in the present invention is preferably 5 to 50 kg/mm$^2$ (49 to 490 MPa), the thermal shrinkage of the support at 100° C. for 30 minutes is preferably 3% or below, and more preferably 1.5% or below, and the thermal shrinkage at 80° C. for 30 minutes is preferably 1% or below, and more preferably 0.5% or below. Its breaking strength is preferably 5 to 100 kg/mm$^2$ (49 to 980 MPa), and its modulus of elasticity is 100 to 2000 kg/mm$^2$ (0.98 to 19.6 GPa). The coefficient of thermal expansion is $1\times10^{-4}$ to $1\times10^{-8}$/° C., and preferably $1\times10^{-5}$ to $1\times10^{-6}$/° C. The coefficient of hygroscopic expansion is $1\times10^{-4}$/RH % or less, and preferably $1\times10^{-5}$/RH % or less. These thermal properties, dimensional properties, and mechanical strength properties are preferably substantially identical, with a difference of 10% or less in any direction within the support surface.

(Production Method)

A process for producing a magnetic coating solution and a non-magnetic layer coating solution for the magnetic recording medium comprises at least a kneading step, a dispersion step and, optionally, a blending step that is carried out prior to and/or subsequent to the above-mentioned steps. Each of these steps may be composed of two or more separate stages. All materials including the magnetic substance, the non-magnetic substance, the binder, the carbon black, the abrasive, the antistatic agent, the lubricant, and the solvent used in the present invention may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader or an extruder. When a kneader is used, all or a part of the binder (preferably 30 wt % or above of the entire binder) is kneaded with the magnetic substance or non-magnetic substance in the range of 15 parts to 500 parts by weight of the binder relative to 100 parts by weight of the magnetic substance. Details of this kneading treatment are disclosed in JP-A-1-106338 and JP-A-1-79274. For the dispersion of a magnetic layer solution and a non-magnetic layer solution, glass beads can be used, but a dispersing medium having a high specific gravity such as zirconia beads, titania beads, or steel beads is suitably used. An optimal particle size and packing density of these dispersing media should be selected. A known dispersing machine can be used.

The following methods are preferably used for coating the magnetic recording medium having a multilayer structure of the present invention. As a first method, a lower layer is coated by a gravure coating, roll coating, blade coating, extrusion coating device, etc. that is generally used for a magnetic coating solution, and an upper layer is coated while the lower layer is still in a wet state by means of a pressurized support type extrusion coating device disclosed in JP-B-1-46186, JP-A-60-238179, and JP-A-2-265672. As a second method, an upper layer and a lower layer are coated substantially simultaneously using a coating head equipped with two slits for feeding a coating solution as disclosed in JP-A-63-88080, JP-A-2-17971 and JP-A-2-265672. As a third method, an upper layer and a lower layer are coated substantially simultaneously using an extrusion coating device equipped with a backup roll as disclosed in JP-A-2-174965. In order to prevent degradation of the electromagnetic conversion characteristics, etc. of the magnetic recording medium due to aggregation of magnetic particles, it is desirable to impart shear to the coating solution within the coating head by a method as described in JP-A-62-95174 and JP-A-1-236968. With respect to the viscosity of the coating solutions, it is necessary for it to lie within the range of values disclosed in JP-A-3-8471. In order to realize the constitution of the present invention, a sequential multi-layer-coating method in which a magnetic layer is coated on top of a lower layer that has been coated and dried can of course be used without impairing the effect of the present invention. However, in order to reduce coating defects and improve the quality of aspects such as dropouts, it is preferable to use the above-mentioned simultaneous multi-layer-coating method, and more preferably a simultaneous dual-coating method.

In the case of a disk, although sufficient isotropic alignment can be obtained without using an alignment device in some cases, it is preferable to employ a known random alignment device such as, for example, arranging cobalt magnets obliquely in turn or applying an alternating magnetic field with a solenoid. The isotropic alignment referred to here means that, in the case of a ferromagnetic metal powder, in general, in-plane two-dimensional random alignment is preferable, but it can be three-dimensional random by introducing a vertical component. In the case of a hexagonal ferrite, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

In the case of a magnetic tape, alignment is carried out in the longitudinal direction using a cobalt magnet or a solenoid. It is preferable for the drying position for a coating to be controlled by controlling the drying temperature and blowing rate and the coating speed; it is preferable for the coating speed to be 20 m/min to 1000 m/min and the temperature of drying air to be at least 60° C., and an appropriate level of pre-drying may be carried out prior to entering a magnetic zone.

Rolls of heat resistant plastic such as epoxy, polyimide, polyamide or polyimideamide, or metal rolls, are used as calendering rolls and, in particular, in the case of double-sided magnetic layer media, it is preferable to use matching metal rolls. The treatment temperature is preferably 50° C. or higher, and more preferably 100° C. or higher. The line pressure is preferably 200 kg/cm (196 kN/m) or above, and more preferably 300 kg/cm (294 kN/m) or above.

(Physical Properties)

The saturation magnetic flux density of the magnetic layer of the magnetic recording medium according to the present invention is generally from 0.2 to 0.5 T when a ferromagnetic metal powder is used, and from 0.1 to 0.3 T when a hexagonal ferrite is used. The coercive force Hc is usually 120 to 400 kA/m, and preferably 136 to 240 kA/m. The coercive force distribution is preferably narrow, and the SFD (Switching Field Distribution) and SFDr are preferably 0.6 or less.

In the case of a magnetic disk, when it is two-dimensional random the squareness ratio is usually 0.55 to 0.67, and preferably 0.58 to 0.64, when it is three-dimensional random, the ratio is preferably 0.45 to 0.55, when it is vertically aligned the ratio is usually at least 0.6 in the vertical direction, and preferably at least 0.7, and when demagnetizing field correction is carried out, the ratio is usually at least 0.7, and preferably at least 0.8. The alignment ratio is preferably at least 0.8 for both two-dimensional random and three-dimensional random. In the case of two-dimensional random, the squareness ratio in the vertical direction, the Br in the vertical direction, and the Hc in the vertical direction are preferably 0.1 to 0.5 times those in the in-plane direction.

In the case of a magnetic tape, the squareness ratio is at least 0.7, and preferably at least 0.8.

The coefficient of friction of the magnetic recording medium with respect to the head is usually 0.5 or less at a temperature of −10° C. to 40° C. and a humidity of 0% to 95%, and preferably 0.3 or less, the surface resistivity is preferably $1\times10^4$ to $1\times10^{12}$ Ω/sq on the magnetic surface, and the static potential is preferably −500 V to +500 V. The modulus of elasticity of the magnetic layer at an elongation of 0.5% is preferably 100 to 2000 Kg/mm² (980 to 19600 N/mm²) in each direction within the surface, the strength at break is preferably 10 to 70 Kg/mm² (98 to 686 N/mm²); the modulus of elasticity of the magnetic recording medium is preferably 100 to 1500 Kg/mm² (980 to 14700 N/mm2) in each direction within the surface, the residual elongation is preferably 0.5% or less, and the thermal shrinkage at any temperature of 100° C. or less is preferably 1% or less, more preferably 0.5% or less, and yet more preferably 0.1% or less. The glass transition temperature of the magnetic layer (the maximum point of the loss modulus in a dynamic viscoelasticity measurement measured at 110 Hz) is preferably at least 50° C. and at most 120° C., and that of the lower layer is preferably 0° C. to 100° C. The loss modulus is preferably in the range of $1\times10^3$ to $8\times10^4$ N/cm², and the loss tangent is preferably 0.2 or less. When the loss tangent is too large, cohesive failure easily occurs. These thermal properties and mechanical properties are preferably substantially identical within 10% in each direction within the surface of the medium. The residual solvent in the magnetic layer is preferably 100 mg/m² or less, and more preferably 10 mg/m² or less. The porosity of the coating layer is preferably 30 vol % or less for both the lower layer and the upper layer, and more preferably 20 vol % or less. In order to achieve a high output, the porosity is preferably small, but there are cases in which a certain value should be maintained depending on the intended purpose. For example, in the case of disk media where repetitive use is considered to be important, a large porosity is often preferable from the point of view of transport durability.

The center plane average surface roughness Ra of the magnetic layer is preferably 4.0 nm or less, more preferably 3.8 nm or less, and particularly preferably 3.5 nm or less, when measured for an area of about 250 μm×250 μm using a TOPO-3D manufactured by Wyko Corporation. The maximum height Rmax of the magnetic layer is preferably 0.5 μm or less, the ten-point average roughness Rz is 0.3 μm or less, the center plane peak height Rp is 0.3 μm or less, the center plane valley depth Rv is 0.3 μm or less, the center plane area factor Sr is at least 20% and at most 80%, and the average wavelength λa is at least 5 μm and at most 300 μm. It is possible to set the number of surface projections on the magnetic layer having a size of 0.01 to 1 μm at any level in the range of 0 to 2,000 counts per 0.1 mm², and by so doing the electromagnetic conversion characteristics and the coefficient of friction can be optimized, which is preferable. The number of surface projections on the magnetic layer in the present invention is a value obtained by measurement using an optical interference type measuring instrument. They can be controlled easily by controlling the surface smoothness of the support by means of a filler, the particle size and the amount of a powder added to the magnetic layer, and the shape of the roll surface in a calendering process. The curl is preferably within ±3 mm.

When the magnetic recording medium has a non-magnetic layer and a magnetic layer, it can easily be anticipated that the physical properties of the non-magnetic layer and the magnetic layer can be varied according to the intended purpose. For example, the elastic modulus of the magnetic layer can be made higher, thereby improving the transport durability, and at the same time the elastic modulus of the non-magnetic layer can be made lower than that of the magnetic layer, thereby improving contact of the magnetic recording medium with a head.

EXAMPLES

The present invention is described in detail below with reference to specific examples, but it should not be construed as being limited thereto.

Preparation of Magnetic Tape

Comparative Example 1

| <Preparation of Coating Solution> | |
|---|---|
| Magnetic layer coating solution | |
| Ferromagnetic metal powder<br>Composition: Co/Fe = 21 atom % Al/Fe = 7 atom %,<br>Y/Fe = 5 atom %<br>Average major axis length = 0.06 μm, average acicular<br>ratio: 6<br>Hc = 2310 Oe (185 kA/m), σs = 137 A · m$^2$/kg | 100 parts |
| Vinyl chloride copolymer MR110 (manufactured by Zeon Corporation) | 12 parts |
| Polyurethane resin UR 8200 (manufactured by Toyobo Co., Ltd.) | 3 parts |
| α-Alumina HIT 55 (manufactured by Sumitomo Chemical Co., Ltd.) | 2 parts |
| Carbon black #55 (manufactured by Asahi Carbon Co., Ltd.) | 1 part |
| Butyl stearate | 1 part |
| Stearic acid | 5 parts |
| Methyl ethyl ketone | 100 parts |
| Cyclohexanone | 20 parts |
| Toluene | 60 parts |
| Non-magnetic coating solution | |
| Non-magnetic powder TiO$_2$ crystal type rutile<br>Average particle size: 0.035 μm, S$_{BET}$: 40 m$^2$/g, pH: 7,<br>TiO$_2$ content 90% or more, DBP oil absorption 27 to 38 ml/<br>100 g, amount of Al$_2$O$_3$ present on the surface: 8 wt %<br>relative to the entire particle | 80 parts |
| Carbon black Conductex SC-U (manufactured by Columbian Carbon Co.) | 20 parts |
| Vinyl chloride copolymer MR110 (manufactured by Zeon Corporation) | 12 parts |
| Polyurethane resin UR8200 (manufactured by Toyobo Co., Ltd.) | 5 parts |
| Phenylphosphonic acid | 4 parts |
| Butyl stearate | 1 part |
| Stearic acid | 3 parts |
| Methyl ethyl ketone/cyclohexanone (8/2 mixed solvent) | 250 parts |

With regard to the above-mentioned coating solutions, each of the components was kneaded in a kneader, and then dispersed using a sand mill for 4 hours. 2.5 parts of a polyisocyanate was added to the dispersion thus obtained of the non-magnetic layer coating solution and 3 parts thereof was added to that of the magnetic layer coating solution, 40 parts of cyclohexanone was added to each thereof, and the solutions were filtered using a filter having an average pore size of 1 μm to give a non-magnetic layer-forming coating solution and a magnetic layer-forming coating solution. An aramid support (product name: Mictron) having a thickness of 4.4 μm and a center plane average surface roughness of 7.0 nm was simultaneously multilayer-coated with the non-magnetic layer coating solution, and immediately after that with the magnetic layer coating solution so that the dry thickness of the lower layer was 1.7 μm and the thickness of the magnetic layer was 0.15 μm, and while the two layers were still in a wet state they were aligned using a cobalt magnet having a magnetic force of 0.6 T and a solenoid having a magnetic force of 0.6 T. After drying, treatment was carried out using a 7 stage calender having only metal rolls at a temperature of 85° C. and a speed of 200 m/min, and subsequently coating with a backing layer (100 parts of carbon black having an average particle size of 17 nm, 80 parts of calcium carbonate having an average particle size of 40 nm, and 5 parts of α-alumina having an average particle size of 200 nm dispersed in a nitrocellulose resin, a polyurethane resin, and a polyisocyanate) having a thickness of 0.5 μm was carried out. The film was slit into a width of 3.8 mm, and mounted in equipment having a slit product outfeed and wind-up system, the magnetic surface was pushed against a non-woven cloth and a razor blade, and the surface of the magnetic layer was cleaned by means of a tape cleaning machine, thus giving a tape sample.

Comparative Example 2

The procedure of Comparative Example 1 was repeated except that one side of the aramid support was coated with a smoothing coating layer coating solution P1 (described in Table 1) at a thickness of 0.05 μm and dried and, without winding up, a non-magnetic layer and a magnetic layer were then formed on the smoothing coating layer in the same manner as in Comparative Example 1, and a tape sample was thus obtained.

Examples 1, 2, and 5 and Comparative Example 3

The procedure of Comparative Example 2 was repeated except that the thickness of the smoothing coating layer was changed as described in Table 2, and tape samples were thus obtained.

Examples 3 and 4, and Comparative Example 5

The procedure of Example 2 was repeated except that the drying conditions for the smoothing coating layer were changed so as to change the amount of residual solvent, and tape samples were thus obtained.

Comparative Example 4

The procedure of Example 2 was repeated except that after forming the smoothing coating layer it was wound up once and then fed out for formation of a lower layer and an upper layer, and a tape sample was thus obtained.

Example 6

The procedure of Example 2 was repeated except that the smoothing coating layer coating solution was changed to P2 (described in Table 1), and after the smoothing coating layer was formed it was exposed to a 5 Mrad electron beam so as to form the smoothing coating layer, and a tape sample was thus obtained.

Comparative Example 7

The procedure of Example 6 was repeated except that after forming the smoothing coating layer it was wound up once and then fed out for formation of a lower layer and an upper layer, and a tape sample was thus obtained.

Examples 7 and 8, and Comparative Example 6

The procedure of Example 6 was repeated except that the drying conditions for the smoothing coating layer were changed so as to change the amount of residual solvent, and samples were thus obtained.

Example 9

The procedure of Example 2 was repeated except that the smoothing coating layer coating solution was changed to P3 (described in Table 1), and after the smoothing coating layer was formed it was exposed to 50 mJ/cm$^2$ ultraviolet rays so as to form the smoothing coating layer, and a tape sample was thus obtained.

Comparative Example 8

The procedure of Example 9 was repeated except that after forming the smoothing coating layer it was wound up once and then fed out for formation of a lower layer and an upper layer, and a tape sample was thus obtained.

TABLE 1

| Type | Material | Solvent | Concentration (wt %) | Viscosity (cp) | Surface tension (mN/m) |
|---|---|---|---|---|---|
| P1 | A | Methanol | 5 | 3 | 22 |
| P2 | B | MEK | 20 | 1 | 24 |
| P3 | C | MEK | 20 | 1 | 24 |

The Materials in Table 1 were as follows.
Material A: a water-soluble polyamide resin ('Water-soluble nylon A-90', number average molecular weight:66000, manufactured by Toray)
Material B: diacrylate of an ethylene oxide-modified bisphenol A ('BP-4EA' manufactured by Kyoeisha Chemical Co., Ltd.)
Material C: a mixture of 95 parts by weight of Material B and 5 parts by weight of benzyl dimethylketal ('Irgacure 651' manufactured by Ciba Specialties)

Comparative Example 9

The procedure of Comparative Example 1 was repeated except that the magnetic coating solution was changed to the one below, and a tape sample was thus obtained. The non-magnetic layer coating solution was the same as in Comparative Example 1.

| Magnetic coating solution | |
|---|---|
| Barium ferrite magnetic powder | 100 parts |
| Composition: Ba/Zn/Co/Nb = 1/1.0/0.5/0.4 (molar ratio) | |
| Vinyl chloride copolymer MR555 (manufactured by Zeon Corporation) | 6 parts |
| Polyurethane resin UR 8200 (manufactured by Toyobo Co., Ltd.) | 3 parts |
| α-Alumina HIT 55 (manufactured by Sumitomo Chemical Co., Ltd.) | 2 parts |
| Carbon black #55 (manufactured by Asahi Carbon Co., Ltd.) | 5 parts |
| Butyl stearate | 1 part |
| Stearic acid | 2 parts |
| Methyl ethyl ketone | 125 parts |
| Cyclohexanone | 125 parts |

Comparative Example 10

The procedure of Comparative Example 9 was repeated except that one side of the aramid support was coated with the smoothing coating layer coating solution P1 (described in Table 1) at a thickness of 0.05 μm and dried and, without winding up, a non-magnetic layer and a magnetic layer were then formed on the smoothing coating layer in the same manner as in Comparative Example 9, and a tape sample was thus obtained.

Examples 10, 11, and 14 and Comparative Example 11

The procedure of Comparative Example 10 was repeated except that the thickness of the smoothing coating layer was changed as described in Table 3, and tape samples were thus obtained.

Comparative Example 12

The procedure of Example 11 was repeated except that after forming the smoothing coating layer it was wound up once and then fed out for formation of a lower layer and an upper layer, and a tape sample was thus obtained.

Examples 12 and 13, and Comparative Example 13

The procedure of Example 11 was repeated except that the drying conditions for the smoothing coating layer were changed so as to change the amount of residual solvent, and samples were thus obtained.

Example 15

The procedure of Example 11 was repeated except that the smoothing coating layer coating solution was changed to P2 (described in Table 1), and after the smoothing coating layer was formed it was exposed to a 5 Mrad electron beam so as to form the smoothing coating layer, and a tape sample was thus obtained.

Comparative Example 15

The procedure of Example 15 was repeated except that after forming the smoothing coating layer it was wound up once and then fed out for formation of a lower layer and an upper layer, and a tape sample was thus obtained.

Examples 16 and 17, and Comparative Example 14

The procedure of Example 15 was repeated except that the drying conditions for the smoothing coating layer were changed so as to change the amount of residual solvent, and samples were thus obtained.

Example 18

The procedure of Example 11 was repeated except that the smoothing coating layer coating solution was changed to P3 (described in Table 1), and after the smoothing coating layer was formed it was exposed to 50 mJ/cm$^2$ ultraviolet rays so as to form the smoothing coating layer, and a tape sample was thus obtained.

Comparative Example 16

The procedure of Example 18 was repeated except that after forming the smoothing coating layer it was wound up once and then fed out for formation of a lower layer and an upper layer, and a tape sample was thus obtained.

Comparative Example 17

The procedure of Comparative Example 1 was repeated except that the non-magnetic layer was not provided, and a tape sample was thus obtained.

Example 19

The procedure of Example 2 was repeated except that the non-magnetic layer was not provided, and a tape sample was thus obtained.

Comparative Example 18

The procedure of Comparative Example 1 was repeated except that the non-magnetic layer and the magnetic layer were provided by a wet-on-dry (W/D) method, and a tape sample was thus obtained.

Example 20

The procedure of Example 2 was repeated except that the non-magnetic layer and the magnetic layer were provided by a wet-on-dry (W/D) method, and a tape sample was thus obtained.

| Preparation of Disk | |
|---|---|
| Magnetic coating solution | |
| Barium ferrite magnetic powder Composition: Ba/Zn/Co/Nb = 1/0.7/0.1/0.3 (molar ratio) | 100 parts |
| Vinyl chloride copolymer MR555 (manufactured by Zeon Corporation) | 5 parts |
| Polyurethane resin UR 8200 (manufactured by Toyobo Co., Ltd.) | 3 parts |
| α-Alumina HIT 55 (manufactured by Sumitomo Chemical Co., Ltd.) | 10 parts |
| Carbon black #55 (manufactured by Asahi Carbon Co., Ltd.) | 1 part |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Non-magnetic coating solution | |
| Non-magnetic powder $TiO_2$ crystal type rutile Average particle size: 0.035 μm, $S_{BET}$: 40 $m^2$/g, pH: 7, $TiO_2$ content 90% or more, DBP oil absorption 27 to 38 ml/100 g, amount of $Al_2O_3$ present on the surface: 8 wt % relative to the entire particle | 80 parts |
| Carbon black Conductex SC-U (manufactured by Columbian Carbon Co.) | 20 parts |
| Vinyl chloride copolymer MR110 (manufactured by Zeon Corporation) | 12 parts |
| Polyurethane resin UR8200 (manufactured by Toyobo Co., Ltd.) | 5 parts |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

With regard to the above-mentioned coating solutions, each of the components was kneaded in a kneader, and then dispersed using a sand mill for 4 hours. 10 parts of a polyisocyanate was added to the dispersion thus obtained of the non-magnetic layer coating solution and 10 parts thereof was added to that of the magnetic layer coating solution, 40 parts of cyclohexanone was added to each thereof, and the solutions were filtered using a filter having an average pore size of 1 μm to give a non-magnetic layer-forming coating solution and a magnetic layer-forming coating solution.

Comparative Example 19

A polyethylene terephthalate support having a thickness of 62 μm and a center plane average surface roughness of 7.0 nm was coated with the magnetic layer coating solution thus obtained so as to give a dry thickness of 0.2 μm, while it was still in a wet state it was aligned randomly by passing it through an alternating magnetic field generating machine having two magnetic field strengths of 25 mT/50 Hz and 12 mT/50 Hz, after drying it was treated using a 7 stage calender at a temperature of 90° C. and a line pressure of 300 kg/cm (294 kN/m), it was stamped into a size of 3.7 inches and subjected to surface polishing, and a disk sample was thus obtained.

Example 21

The procedure of Comparative Example 19 was repeated except that one side of the support was coated with the smoothing coating layer coating solution P1 (described in Table 1) at a thickness of 0.03 μm and dried and, without winding up, a magnetic layer was then formed on the smoothing coating layer in the same manner as in Comparative Example 19, and a disk sample was thus obtained.

Comparative Example 20

A polyethylene terephthalate support having a thickness of 62 μm and a center plane average surface roughness of 7.0 nm was coated with the non-magnetic layer coating solution obtained above so as to give a dry thickness of 1.5 μm and dried, the non-magnetic layer thus obtained was coated with the magnetic solution at a thickness of 0.15 μm, and while the magnetic layer was still in a wet state it was aligned randomly in the same manner as in Comparative Example 19, and a disk sample was obtained in the same manner as in Comparative Example 19.

Example 22

The procedure of Comparative Example 20 was repeated except that one side of the support was coated with the smoothing coating layer in the same manner as in Example 21 and dried and, without winding up, a non-magnetic layer and a magnetic layer were then formed on the smoothing coating layer in the same manner as in Comparative Example 20, and a disk sample was thus obtained.

Comparative Example 21

A polyethylene terephthalate support having a thickness of 62 μm and a center plane average surface roughness of 7.0 nm was simultaneously multilayer-coated with the non-magnetic layer coating solution, and immediately after that with the magnetic layer coating solution thus obtained so that the dry thickness of the non-magnetic layer was 1.5 μm and the thickness of the magnetic layer was 0.15 μm, and while the two layers were still in a wet state they were randomly aligned in the same manner as in Comparative Example 19, and a disk sample was obtained in the same manner as in Comparative Example 19.

Example 23

The procedure of Comparative Example 21 was repeated except that one side of the support was coated with the smoothing coating layer in the same manner as in Example 21 and dried and, without winding up, a non-magnetic layer and a magnetic layer were then formed on the smoothing coating layer in the same manner as in Comparative Example 21, and a disk sample was thus obtained.

The characteristics of the computer tapes and the magnetic disks thus produced were evaluated by the measurement methods below.

Measurement Methods
(1) C/N ratio (tape): measurement was carried out by mounting a recording head (MIG, gap 0.15 μm, 1.8 T) and an MR playback head on a drum tester. The head-medium relative speed was 1 to 3 m/min, and modulation noise was measured as the noise. The areal density was 0.57 Gbit/$inch^2$ (track pitch: 6.8 μm, bit length: 0.165 μm).
(2) S/N ratio (disk): measurement was carried out by mounting a recording head ((MIG (Metal in Gap)), gap 0.15 μm, 1.8 T) and an MR playback head on a spin stand. The rotational speed was 2,500 to 3,500 rpm, the radius was 30 mm, and the noise was DC noise. The areal density was 1 Gbit/inch$^2$ (track pitch: 1 μm, bit length: 0.03 μm).
(3) Durability: A DDS drive was used, and after recording a predetermined signal, it was run at 50° C. and 10% RH for 100 passes while monitoring a playback signal. The ratio of the playback output after running relative to the initial playback output was evaluated.
(4) PN (20 nm or higher) of the smoothing coating layer: projections were measured in a 30 μm square area (900 μm2) using a Nanoscope 3 manufactured by Digital Instruments (AFM: atomic force microscope) with a four-sided pyramidal SiN probe having a tip angle of 700.
(5) Amount of smoothing coating layer dissolving: the amount thereof dissolving into a methyl ethyl ketone (MEK)/cyclohexanone mixed solution (1:1) was determined.
(6) Amount of residual solvent in smoothing coating layer: measured by gas chromatography. The measurement conditions were as follows.

Gas chromatograph: GC12A (Shimadzu Corporation)

Column: Packed column (packing: Chromosorb 101)

Sample size: 2 cm×10 cm

Measurement conditions: a sample was heated in a sample chamber at 160° C. for 2 minutes, then the gas within the sample chamber was introduced into the gas chromatograph. The temperature of the gas chromatograph was 160° C.

Evaluation results for the magnetic tapes are given in Tables 2 to 4, and evaluation results for the magnetic disks are given in Table 5.

TABLE 2

Tape (metal type; simultaneous multi-layer)

| Sample No | Smoothing coating layer ||||||| Winding after forming smoothing coating layer | Condition of support | C/N ratio (dB) | Durability (%) |
| | Type of coating solution | Thickness (μm) | Amount of dissolution [1] | Amount of residual solvent [1] | Ra (nm) | PN (20 nm or higher) [2] | Drying temperature (° C.) | | | | |
| --- | --- | --- | --- | --- | --- | --- | --- | --- | --- | --- | --- |
| Comp. Ex. 1 | None | — | — | — | 7.0 | 42 | — | No | No creasing | −5.4 | 98 |
| Comp. Ex. 2 | P1 | 0.05 | 0 | 1 | 6.3 | 31 | 80 | No | No creasing | −3.4 | 98 |
| Ex. 1 | P1 | 0.1 | 0 | 1 | 4.5 | 18 | 80 | No | No creasing | 0.0 | 98 |
| Ex. 2 | P1 | 0.5 | 0.11 | 5 | 1.8 | 6 | 80 | No | No creasing | 2.2 | 95 |
| Ex. 3 | P1 | 0.5 | 0.1 | 3 | 1.8 | 6 | 90 | No | No creasing | 2.2 | 98 |
| Ex. 4 | P1 | 0.5 | 0.12 | 8 | 1.8 | 6 | 90 | No | No creasing | 2.2 | 90 |
| Ex. 5 | P1 | 1.0 | 0.14 | 9 | 1.6 | 3 | 80 | No | No creasing | 3.4 | 85 |
| Comp. Ex. 3 | P1 | 1.5 | 0.19 | 10 | 5.8 | 1 | 80 | No | No creasing | −2.7 | 85 |
| Comp. Ex. 4 | P1 | 0.5 | 0.11 | 8 | 1.8 | 6 | 80 | Yes | Creasing | N/A | N/A |
| Comp. Ex. 5 | P1 | 0.5 | 0.18 | 15 | 1.8 | 6 | 90 | No | No creasing | 2.2 | 70 |
| Ex. 6 | P2 | 0.5 | 0 | 3 | 1.4 | 3 | 70 | No | No creasing | 4.0 | 98 |
| Ex. 7 | P2 | 0.5 | 0 | 5 | 1.4 | 3 | 90 | No | No creasing | 4.0 | 95 |
| Ex. 8 | P2 | 0.5 | 0 | 8 | 1.4 | 3 | 60 | No | No creasing | 4.0 | 92 |
| Comp. Ex 6 | P2 | 0.5 | 0 | 12 | 1.4 | 2 | Natural drying | No | No creasing | 4.0 | 75 |
| Comp. Ex. 7 | P2 | 0.5 | 0 | 3 | 1.4 | 3 | 70 | Yes | Creasing | N/A | N/A |
| Ex. 9 | P3 | 0.5 | 0 | 3 | 1.6 | 5 | 80 | No | No creasing | 3.8 | 96 |
| Comp. Ex. 8 | P3 | 0.5 | 0 | 3 | 1.6 | 5 | 80 | Yes | Creasing | N/A | N/A |

[1] Amount of dissolution is expressed as mg/cm$^2$. Amount of residual solvent is expressed as mg/m$^2$.
[2] PN (20 nm or higher) is expressed as the number of projections/900 μm$^2$.

TABLE 3

Tape (BaFe type; simultaneous multi-layer)

| Sample No | Smoothing coating layer ||||||| Winding after forming smoothing coating layer | Condition of support | C/N ratio (dB) | Durability (%) |
| | Type of coating solution | Thickness (μm) | Amount of dissolution [1] | Amount of residual solvent [1] | Ra (nm) | PN (20 nm or higher) [2] | Drying temperature (° C.) | | | | |
| --- | --- | --- | --- | --- | --- | --- | --- | --- | --- | --- | --- |
| Comp. Ex. 9 | None | — | — | — | 7 | 42 | — | No | No creasing | −4.2 | 98 |

TABLE 3-continued

Tape (BaFe type; simultaneous multi-layer)

Smoothing coating layer

| Sample No | Type of coating solution | Thickness (μm) | Amount of dissolution [1] | Amount of residual solvent [1] | Ra (nm) | PN (20 nm or higher) [2] | Drying temperature (° C.) | Winding after forming smoothing coating layer | Condition of support | C/N ratio (dB) | Durability (%) |
|---|---|---|---|---|---|---|---|---|---|---|---|
| Comp. Ex. 10 | P1 | 0.05 | 0 | 1 | 6.3 | 31 | 80 | No | No creasing | −2.8 | 98 |
| Ex. 10 | P1 | 0.1 | 0 | 1 | 4.5 | 18 | 80 | No | No creasing | 2.0 | 98 |
| Ex. 11 | P1 | 0.5 | 0.11 | 5 | 1.8 | 6 | 80 | No | No creasing | 4.6 | 96 |
| Ex. 12 | P1 | 0.5 | 0.1 | 3 | 1.8 | 6 | 90 | No | No creasing | 4.6 | 92 |
| Ex. 13 | P1 | 0.5 | 0.12 | 8 | 1.8 | 6 | 90 | No | No creasing | 4.6 | 90 |
| Ex. 14 | P1 | 1.0 | 0.14 | 9 | 1.6 | 3 | 80 | No | No creasing | 5.4 | 88 |
| Comp. Ex. 11 | P1 | 1.5 | 0.19 | 10 | 5.8 | 1 | 80 | No | No creasing | −0.5 | 85 |
| Comp. Ex. 12 | P1 | 0.5 | 0.11 | 8 | 1.8 | 6 | 80 | Yes | Creasing | N/A | N/A |
| Comp. Ex. 13 | P1 | 0.5 | 0.18 | 15 | 1.8 | 6 | 90 | No | No creasing | 4.6 | 74 |
| Ex. 15 | P2 | 0.5 | 0 | 3 | 1.4 | 3 | 70 | No | No creasing | 5.8 | 98 |
| Ex. 16 | P2 | 0.5 | 0 | 5 | 1.4 | 3 | 90 | No | No creasing | 5.8 | 97 |
| Ex. 17 | P2 | 0.5 | 0 | 8 | 1.4 | 3 | 60 | No | No creasing | 5.8 | 94 |
| Comp. Ex. 14 | P2 | 0.5 | 0 | 12 | 1.4 | 2 | Natural drying | No | No creasing | 5.8 | 78 |
| Comp. Ex. 15 | P2 | 0.5 | 0 | 3 | 1.4 | 3 | 70 | Yes | Creasing | N/A | N/A |
| Ex. 18 | P3 | 0.5 | 0 | 3 | 1.6 | 5 | 80 | No | No creasing | 5.2 | 97 |
| Comp. Ex. 16 | P3 | 0.5 | 0 | 3 | 1.6 | 5 | 80 | Yes | Creasing | N/A | N/A |

[1] Amount of dissolution is expressed as mg/cm$^2$. Amount of residual solvent is expressed as mg/m$^2$.
[2] PN (20 nm or higher) is expressed as the number of projections/900 μm$^2$.

TABLE 4

Tape (Single layer, W/D)

| Sample No | Type of coating solution | Thickness (μm) | Amount of dissolution [1] | Amount of residual solvent [1] | Ra (nm) | PN (20 nm or higher) [2] | Drying temperature (° C.) | C/N ratio (dB) | Notes |
|---|---|---|---|---|---|---|---|---|---|
| Comp. Ex. 17 | None | — | — | — | 7 | 42 | — | −6.2 | Single layer |
| Ex. 19 | P1 | 0.5 | 0 | 3 | 2.2 | 10 | 90 | 2.0 | Single layer |
| Comp. Ex. 18 | None | — | — | — | 7 | 42 | — | −4.4 | W/D |
| Ex. 20 | P1 | 0.5 | 0 | 3 | 2.1 | 10 | 80 | 3.1 | W/D |

[1] Amount of dissolution is expressed as mg/cm$^2$. Amount of residual solvent is expressed as mg/m$^2$.
[2] PN (20 nm or higher) is expressed as the number of projections/900 μm$^2$.

TABLE 5

Disk

| Sample No | Type of coating solution | Thickness (μm) | Amount of dissolution [1] | Amount of residual solvent [1] | Ra (nm) | PN (20 nm or higher) [2] | Drying temperature (° C.) | S/N ratio (dB) | Notes |
|---|---|---|---|---|---|---|---|---|---|
| Comp. Ex. 19 | None | — | — | — | 7.0 | 72 | — | −5.3 | Single layer |
| Ex. 21 | P1 | 0.3 | 0 | 3 | 2.0 | 11 | 80 | 2.1 | Single layer |

TABLE 5-continued

| Sample No | Type of coating solution | Disk Thickness (μm) | Amount of dissolution [1] | Amount of residual solvent [1] | Ra (nm) | PN (20 nm or higher) [2] | Drying temperature (° C.) | S/N ratio (dB) | Notes |
|---|---|---|---|---|---|---|---|---|---|
| Comp. Ex. 20 | None | — | — | — | 7.0 | 65 | — | −4.8 | W/D |
| Ex. 22 | P1 | 0.3 | 0 | 3 | 2.4 | 9 | 80 | 3.2 | W/D |
| Comp. Ex. 21 | None | — | — | — | 7.0 | 60 | — | −4.2 | W/W |
| Ex. 23 | P1 | 0.3 | 0 | 3 | 2.1 | 6 | 80 | 3.6 | W/W |

[1] Amount of dissolution is expressed as mg/cm$^2$. Amount of residual solvent is expressed as mg/m$^2$.
[2] PN (20 nm or higher) is expressed as the number of projections/900 μm$^2$.

EFFECTS OF THE INVENTION

In accordance with the present invention, a magnetic recording medium having excellent electromagnetic conversion characteristics can be produced using a rough base.

What is claimed is:

1. A process for producing a magnetic recording medium having at least one magnetic layer formed above a support, the process comprising:
    a step of providing, on at least one side of the support, a smoothing coating layer having a thickness of 0.10 to 1 μm, a surface roughness of at most 5 nm, a number of projections having a height of 20 nm or higher measured by atomic force microscopy (AFM) of at most 20 projections/900 μm$^2$, and an amount of residual solvent of less than 10 mg/m$^2$; and
    a step of forming at least one magnetic layer on or above the smoothing coating layer without winding up.

2. The process for producing a magnetic recording medium according to claim 1, wherein the smoothing coating layer is formed by coating with a polymer solution and drying.

3. The process for producing a magnetic recording medium according to claim 2, wherein in the polymer solution, a polymer compound having a number average molecular weight of 10,000 to 100,000 is used.

4. The process for producing a magnetic recording medium according to claim 1, wherein the smoothing coating layer is formed by coating with a coating solution containing a compound having a radiation curing functional group in the molecule, and then irradiating with radiation so as to cure the compound.

5. The process for producing a magnetic recording medium according to claim 4, wherein the compound having the radiation curing functional group is a di- or higher-functional acrylate compound having a molecular weight of 200 to 4,000.

6. The process for producing a magnetic recording medium according to claim 1, wherein the smoothing coating layer is formed by coating with a coating solution containing a compound having a ultraviolet-curing functional group in the molecule, and then irradiating with ultraviolet rays so as to cure the compound.

7. The process for producing a magnetic recording medium according to claim 1, wherein the smoothing coating layer has a thickness of 0.2 to 0.7 μm.

8. The process for producing a magnetic recording medium according to claim 1, wherein the smoothing coating layer has a surface roughness of 0.5 to 4.0 nm.

9. The process for producing a magnetic recording medium according to claim 1, wherein the smoothing coating layer has an amount of residual solvent of at most 5 mg/m$^2$.

10. The process for producing a magnetic recording medium according to claim 1, wherein the smoothing coating layer has an amount thereof that dissolves in a methyl ethyl ketone/cyclohexanone mixed solution (1:1) of 0.0 to 0.4 mg/cm$^2$.

11. The process for producing a magnetic recording medium according to claim 1, wherein the support has a thickness of 3.0 to 6.5 μm.

12. The process for producing a magnetic recording medium according to claim 1, wherein the magnetic layer has a thickness of 20 to 500 nm.

13. The process for producing a magnetic recording medium according to claim 1, wherein a non-magnetic layer containing a non-magnetic powder and a binder and having a thickness of 0.5 to 3.0 μm is provided between the magnetic layer and the smoothing coating layer.

14. The process for producing a magnetic recording medium according to claim 13, wherein the non-magnetic layer and the magnetic layer are provided by wet-on-wet coating.

15. The process for producing a magnetic recording medium according to claim 1, wherein the process comprises a step of drying with drying air at 60° C. or higher after the step of forming the magnetic layer.

16. The process for producing a magnetic recording medium according to claim 1, wherein the magnetic layer employs a ferromagnetic metal powder.

17. The process for producing a magnetic recording medium according to claim 1, wherein the magnetic layer employs a hexagonal ferrite powder.

* * * * *